(12) United States Patent
Herman et al.

(10) Patent No.: US 11,614,338 B2
(45) Date of Patent: Mar. 28, 2023

(54) METHOD AND APPARATUS FOR IMPROVED LOCATION DECISIONS BASED ON SURROUNDINGS

(71) Applicant: FORD GLOBAL TECHNOLOGIES, LLC, Dearborn, MI (US)

(72) Inventors: David Michael Herman, Oak Park, MI (US); Stephen Jay Orris, Jr., New Boston, MI (US); David Joseph Orris, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 16/921,279

(22) Filed: Jul. 6, 2020

(65) Prior Publication Data

US 2020/0333158 A1  Oct. 22, 2020

Related U.S. Application Data

(63) Continuation of application No. 16/199,406, filed on Nov. 26, 2018, now Pat. No. 10,704,918.

(51) Int. Cl.
*G01C 21/34* (2006.01)
*G01C 21/36* (2006.01)
*G06K 9/00* (2022.01)
*G06Q 10/02* (2012.01)
*G06Q 50/30* (2012.01)
*G06V 20/10* (2022.01)

(52) U.S. Cl.
CPC ..... *G01C 21/3623* (2013.01); *G01C 21/3438* (2013.01); *G01C 21/362* (2013.01); *G06Q 10/02* (2013.01); *G06Q 50/30* (2013.01); *G06V 20/10* (2022.01)

(58) Field of Classification Search
CPC ............ G01C 21/3623; G01C 21/3438; G01C 21/362; G06V 20/10; G06Q 10/02; G06Q 50/03
See application file for complete search history.

(56) References Cited

U.S. PATENT DOCUMENTS

| | | |
|---|---|---|
| 9,177,224 B1 | 11/2015 | Heller et al. |
| 9,530,235 B2 | 12/2016 | Strelow et al. |
| 9,635,251 B2 | 4/2017 | Wagner et al. |
| 9,983,022 B2 | 5/2018 | Horita et al. |

(Continued)

OTHER PUBLICATIONS

Davison et al., "MonoSLAM: Real-Time Single Camera SLAM", IEEE Transactions on Pattern Analysis and Machine Intelligence, vol. 29, No. 6, Jun. 2007, 16 pgs., IEEE Computer Society.

(Continued)

*Primary Examiner* — Peter D Nolan
*Assistant Examiner* — Demetra R Smith-Stewart
(74) *Attorney, Agent, or Firm* — Vichit Chea; Brooks Kushman P.C.

(57) ABSTRACT

A system includes a processor configured to receive imaging of an environment surrounding a user, captured by a user device. The processor is also configured to identify a plurality of non-user entities in the image. The processor is further configured to identify a user location relative to the non-user entities. The processor is also configured to generate a digital representation of the user location relative to the non-user entities and convey the digital representation to a vehicle requested by the user.

18 Claims, 20 Drawing Sheets

(56) References Cited

U.S. PATENT DOCUMENTS

| | | | |
|---|---|---|---|
| 9,989,969 | B2 | 6/2018 | Eustice et al. |
| 10,106,153 | B1 | 10/2018 | Xiao et al. |
| 10,134,286 | B1 | 11/2018 | Elswick et al. |
| 10,297,152 | B1* | 5/2019 | Patel .................. G01S 17/89 |
| 10,372,130 | B1* | 8/2019 | Kaushansky ......... B60W 50/14 |
| 10,504,008 | B1 | 12/2019 | Powers et al. |
| 10,670,416 | B2 | 6/2020 | Wheeler et al. |
| 10,809,081 | B1* | 10/2020 | Kentley-Klay ........ G08G 1/202 |
| 10,837,788 | B1* | 11/2020 | Kentley-Klay .... G01C 21/3438 |
| 2011/0285810 | A1 | 11/2011 | Wagner et al. |
| 2012/0300020 | A1 | 11/2012 | Arth et al. |
| 2013/0057686 | A1 | 3/2013 | Genc et al. |
| 2014/0111647 | A1 | 4/2014 | Atsmon et al. |
| 2016/0055749 | A1 | 2/2016 | Nicoll et al. |
| 2017/0011631 | A1 | 1/2017 | Nordbruch et al. |
| 2018/0218605 | A1 | 8/2018 | Mowatt et al. |
| 2018/0286239 | A1 | 10/2018 | Kaloyeros et al. |
| 2018/0286240 | A1 | 10/2018 | Harai |
| 2018/0341274 | A1 | 11/2018 | Donnelly et al. |
| 2018/0349699 | A1* | 12/2018 | O'Connell ......... G01C 21/3438 |
| 2018/0373936 | A1 | 12/2018 | Kim et al. |
| 2019/0137290 | A1* | 5/2019 | Levy .................. B60Q 1/50 |
| 2019/0145765 | A1 | 5/2019 | Luo et al. |
| 2019/0156206 | A1 | 5/2019 | Graham et al. |
| 2019/0259182 | A1 | 8/2019 | Sarukkai et al. |
| 2020/0041303 | A1 | 2/2020 | Friedman et al. |
| 2020/0089973 | A1 | 3/2020 | Efland |
| 2020/0124427 | A1 | 4/2020 | Kline et al. |
| 2020/0125107 | A1 | 4/2020 | Schlicht et al. |
| 2020/0226926 | A1 | 7/2020 | Suzuki et al. |
| 2020/0380711 | A1 | 12/2020 | Luo |

OTHER PUBLICATIONS

Sanchez et al., "Localization and tracking in known large environments using portable real-time 3D sensors", Computer Vision and Image Understanding 149 (2016) pp. 197-208, Elsevier.

Balzer et al., "CLAM: Coupled Localization and Mapping with Efficient Outlier Handling", CVPR2013, Computer Vision Foundation, IEEE Xplore, 8 pgs.

Salarian et al., "Accurate Image based Localization by applying SFM and coordinate System Registration", 2016 IEEE International Symposium on Multimedia, Electrical and computer Engineering Department, University of Illinois at Chicago, Chicago, USA, 4 pgs.

Piasco et al., "A survey on Visual-Based Localization: On the benefit of heterogeneous data", Pattern Recognition 74 (2018) pp. 90-109, Elsevier.

Yassin et al., "A Survey of Positioning Techniques and Location Based Services in Wireless Networks", 2015, IEEE, 5 pgs.

Yeh et al., "A Study on Outdoor Positioning Technology Using GPS and WiFi Networks", Proceedings of the 2009 EEE International Conference on Networking, Sensing and Control, Okayama, Japan, March 26-29-2009, 5 pgs.

Huang et al., "6-DOF VR Videos with a Single 360-Camera", 2017 IEEE Virtual Reality (VR), Mar. 18-22, 2017, Los Angeles, CA, USA, 8 pgs.

Arth et al., "Wide Area Localization on Mobile Phones", Graz University of Technology, Austria, 10 pgs.

Brejcha et al., "State-of-the-Art in Visual Geo-localization", Faculty of Information Technology, Brno University of Technology, Czech., 45 pgs.

Ni et al., "Real-time Global Motion Blur Detection", MIT Lincoln Laboratory, 2012 IEEE, ICIP 2012, pp. 3101-3104.

Arth et al., "Real-Time Self-Localization from Panoramic Images on Mobile Devices", IEEE Internatioanal Symposium on Mixed and Augmented Reality Science and Technology Proceedings Oct. 26-29, Basel, Switzerland, 10 pgs., 2011 IEEE.

Gasparini et al., "Optimizing Image Registration for Interactive Applications", University of Modena and Reggio Emilia, Italy, 10 pgs.

Lynen et al., "Get Out of My Lab: Large-scale, Real-Time Visual-Inertial Localization", Computer Vision and Geometry Group, Department of Computer Science, ETH Zurich, Google, Inc., Mountain View, CA, 10 pgs.

Sattler et al., "Fast Image-Based Localization using Direct 2D-to-3D Matching", ICCV 2011, 2011 IEEE, 8 pgs.

Vidal et al., "Automatic Video to Point Cloud Registration in a Structure-From-Motion Framework", 5 pgs.

Sattler et al., "Are Large-Scale 3D Models Really Necessary for Accurate Visual Localization?", Computer Vision Foundation, IEEE Xplore, 10 pgs.

Carrera et al., "3D Scene Reconstruction with a Mobile Camera", Stanford University: CS231A, 10 pgs.

Zamir, Amir Roshan, "Visual Geo-Localization and Location-Aware Image Understanding", M.S. University of Central Florida, 2013, Spring Term 2014, 2014 Amir Roshan Zamir.

Han et al., "A review of algorithms for filtering the 3D point cloud", Signal Processing: Image Communication 57 (2017) 103-112, Elsevier.

Manweiler, "Satellites in Our Pockets: An Object Positioning System using Smartphones", Mobisys' 12, Jun. 25-29, 2012, Low Wood Bay, Lake District, UK 2012, 14 pgs.

Lim et al., "Real-time Image-based 6-DOF Localization in Large-Scale Environments" 8 pages, 2012 IEEE.

\* cited by examiner

METHOD AND APPARATUS FOR IMPROVED LOCATION DECISIONS BASED ON SURROUNDINGS

CROSS-REFERENCE TO RELATED APPLICATIONS

This application is a continuation of U.S. Ser. No. 16/199,406 filed Nov. 26, 2018, now U.S. Pat. No. 10,704,918, issued Jul. 7, 2020, the disclosure of which is hereby incorporated in its entirety by reference herein.

TECHNICAL FIELD

The illustrative embodiments generally relate to methods and apparatuses for improved location decision based on surroundings.

BACKGROUND

A ride hailing service is dependent on the capability for the user and vehicle to identify each other's position accurately so the user can enter the vehicle and begin their service. Delays in user's and vehicles identifying each other's location accurately results in decreased utilization (higher costs) and potential missed rides, or loss of revenue. Positional accuracy of a mobile device, however, which is typically used to identify a requesting user's location, may be limited due to technical limitations of GNSS solutions and cellular triangulation.

Users of ride hailing services and the vehicles/drivers themselves must be able to visually identify each other through some method, however limited sight lines due to obstructions or other environmental variables can increase the amount of time spent looking for the vehicle. An example of this issue would be a user being located at the corner of a building but being located by GNSS or cellular triangulation on the wrong side of the corner, which could result in the driver looking for the user in the wrong place, which would cause delay. Another example may be a user located on a section of the street which does not allow parking. For an autonomous vehicle (AV) and/or human drivers, this fact may prevent or delay pick up.

SUMMARY

In a first illustrative embodiment, a system includes a processor configured to receive imaging of an environment surrounding a user, captured by a user device. The processor is also configured to identify a plurality of non-user entities in the image. The processor is further configured to identify a user location relative to the non-user entities. The processor is also configured to generate a digital representation of the user location relative to the non-user entities and convey the digital representation to a vehicle requested by the user.

In a second illustrative embodiment, a method includes receiving imaging of an environment surrounding a user, captured by a user device. The method further includes identifying an object determined to be within a predefined distance, determined from the imaging, of a user location. The method also includes identifying a user location relative to the object. The method additionally includes generating a digital representation of the user location relative to the object and conveying the digital representation to a vehicle requested by the user.

In a third illustrative embodiment, a method includes receiving, at a vehicle, a digital representation of a pick-up location, including a digital representation of at least one non-user entity or object. The method further includes viewing a scene, from a vehicle perspective, including the real world equivalent of the non-user entity or object. The method also includes showing the viewed scene, representing live, real world imaging, with a likely user digital indicator, indicating a passenger, included therein at a location relative to the real world equivalent determined based on location data included in the digital representation, indicating a passenger location relative to the non-user entity or object.

DETAILED DESCRIPTION

Figure 1:
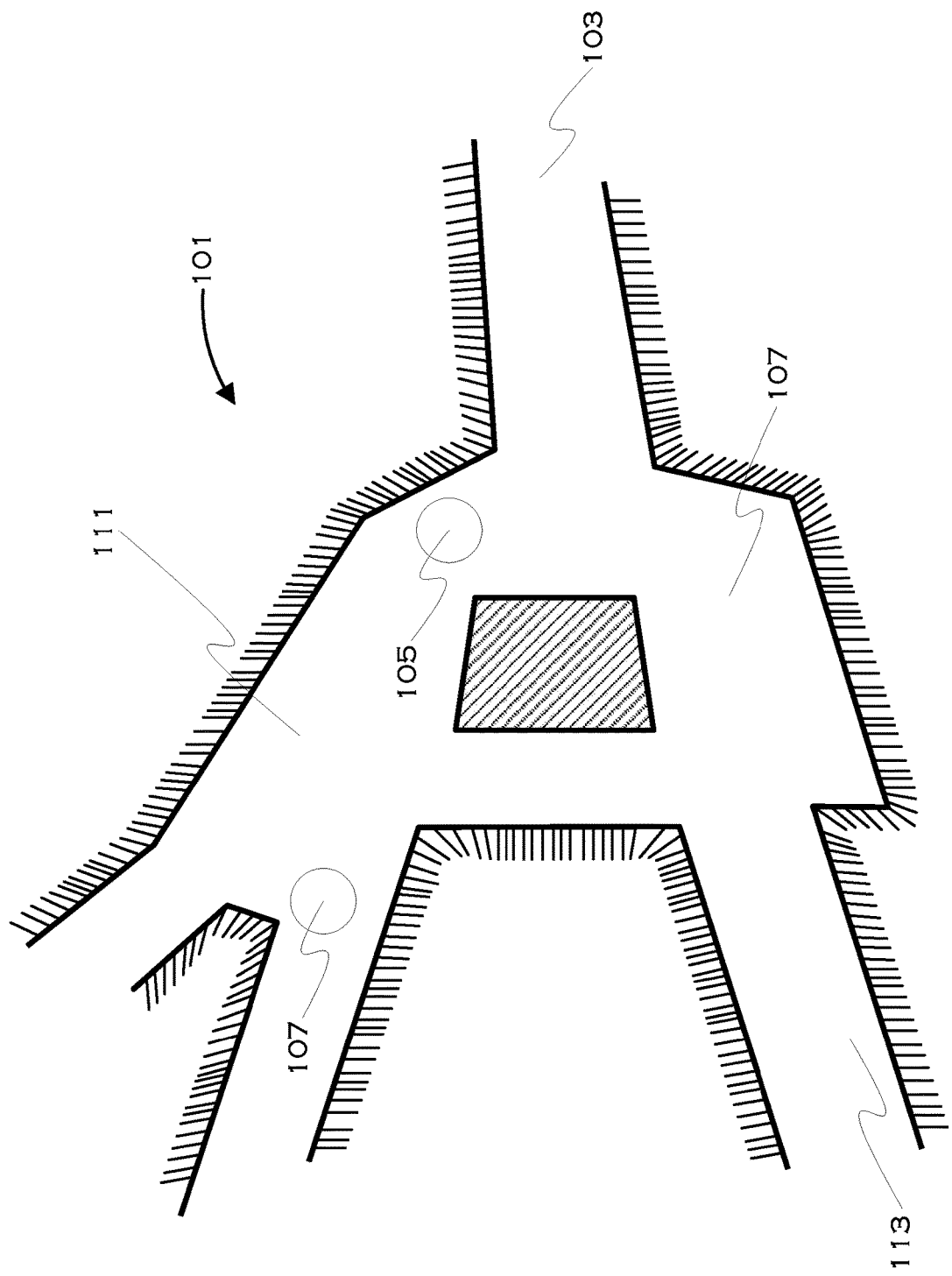
FIG. 1 shows an illustrative example of a city environment.

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

It is well known that GPS positional accuracy is intrinsically limited and can suffer from further errors due to external conditions such as the effects of "urban canyons". This can make it challenging for hailed vehicles, human or autonomous, to positively locate pedestrians. This may lead to longer delays between riders, vehicles finding the incorrect person(s), or even a rider being stranded after a vehicle cannot find the user at the location GPS has indicated. This is even more of an issue in an urban environment where sight lines of pedestrians and vehicles are limited.

For example, a pedestrian may be waiting on one side of a building but the vehicle may only have sight lines on another side of the building where it navigated to based on erroneous signals. Additionally, in city environments, repositioning the vehicle to locate the user would take more time than a suburban or rural environment. In this city environment it may make more sense to relocate the passenger prior to pick-up. The illustrative embodiments are capable of utilizing visual data coupled with cooperating passenger interaction to improve the efficiency of passenger pick-up transaction. This can include, for example, more accurately locating a passenger location and/or the passenger and vehicle collaborating to agree upon an efficient pickup location based on an initial passenger request location.

To date, some methods other than GPS have been utilized to localize a user. For example, ride hailing services allow a user to localize themselves by placing a pin on a map on a user's cell phone. While this may be an improvement to the initial GPS location, the position suggested may have limited precision and the user may be confused by the map orientation compared to their current physical space. Studies have shown that GPS coordinates can be off by over 50 feet under certain weather conditions, even in an open environment, and can be off by hundreds of feet in urban canyons. In a busy city environment, even an error of 20 or 30 feet can misplace a user on the wrong side of a street or a different street, and because of traffic and road constraints, this can render many pickups a practical impossibility.

In other cases, the driver and user may call one another to provide verbal instructions for navigation or further localization. This method can easily fail if the user or driver is unfamiliar with the location or there are not notable landmarks that the user can describe. In the future, where autonomous vehicles (AVs) are prevalent, there will likely be a larger density of ride hailing/sharing/pooling users in a given location. This will increase the rate of false positives compared to today's positional accuracy impacting a fleet operator's ability to control route optimization. Clearly a better method to localize and correctly identify a user in outside environments is needed. Secondarily, a better method to recommend an alternative nearby location for meetup is needed based on live conditions around the user, as static map data does not always reflect real-time conditions as would be evidenced by a live or recent imaging (e.g., static images or video) of the passenger's surroundings.

Another reason to improve the localization problem for ride hailing/sharing/pooling is to minimize the cost of downtime. Increased pickup efficiency leads to increased utilization rates, which are an important component of maximizing profitability. Decreasing the rate of a vehicle that is unable locate a user or the time required to search and load a user can both help the owner/operator maximize profit as well as improving passenger experience.

Under the illustrative embodiments, an application on a user device will generate an accurate position of the user in 3-dimensional space based on a 3D point cloud generated from imaging (e.g. video) taken by the user. Generally speaking, the application would instruct the user to take a video moving the camera around their position to generate a 3D point cloud using a structure from motion algorithm. This point cloud would be used to generate a more accurate location in 3D space and other important information which would be uploaded to the cloud so that the ride hailing vehicle could be provided the most accurate location to meet the user at. The ride hailing service may also use the data to suggest a more efficient location for the user to meet the vehicle at to reduce on-boarding time.

In one set of embodiments, the process may use the visual and map data to identify parking options or pickup options for a passenger and/or driver. For example, there are several potential sources for parking data, including, for example, spaces where vehicles have successfully performed pickups and spaces marked in map data as parking spaces. In addition, visual data can help identify both temporary available spaces and/or pickup zones, even if not designated on map data.

It may take some time for map data to include all possible parking locations, so the illustrative embodiments can use temporary objects, such as other vehicles, to identify places where vehicles are presently parked, as well as empty spaces within those areas. More is discussed with respect to this concept in FIGS. 5-7.

In still further embodiments, image data can be used to virtually locate the user in real-time. Because the user can image the surroundings, and because this image data reflects who the user is not (in terms of people) and where the user is standing relative to immediately localized objects (e.g., stop signs, bus stops, etc), these embodiments can aid a driver in spotting a user standing within a crowd of people.

While people may move around in space, and certainly are not likely to stand perfectly still after they are included in an image, an image of surrounding people can reveal key characteristics of those people (such as general height, clothing color, facial features, etc). This data can be processed to derive a virtual or augmented reality environment in which the user is represented by the camera perspective point. Coupled with reference to a fixed object, for example, a driver's camera can view the same scene from a different perspective, identify, more or less, where a user is expected to be standing relative to the fixed object, and then "suggest" people in the crowd that might represent the user based on the localization and knowledge of who the user is not (i.e., the people that are included in the imaging). If the imaging is taken close to an arrival time, the movement of surrounding people may generally be limited, and as long as the user does not deviate significantly from a current location (where the image was taken), there can be a reasonable expectation about where to find the user and who the non-users in near proximity are. This can also simply aid the driver in knowing generally where to look within a crowd, thus improving the ability of the driver to spot a user in a crowd of people, even if the system cannot perfectly identify a given user.

The user may also be asked to include a current selfie (self photograph), in some embodiments, so that characterizations about the user's present clothing and headwear, made with respect to the non-user entities, are not accidentally used to exempt the real user from consideration. For example, if the user has a black coat and a brown hat, but someone nearby also has a black coat and a brown hat, the selfie may help prevent the user from accidentally being considered (by the driver's camera) as being the non-user that is (or was) actually standing nearby during the imaging.

Finding a given user in a crowd of people, especially at places like an airport where a number of people have hailed ride-share services, can be a difficult task, and the illustrative examples provide a methodology for improving the driver's ability to isolate and identify the user. This can improve throughput time for servicing and, in the aggregate, can save hundreds of hours in time otherwise spent trying to determine who the user is as a driver arrives.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

FIG. 1 shows an illustrative example of a city environment 101. A user may be located at position 105, which in this example would be an unsuitable location for pickup. Also, because of the effect of urban canyons on GPS, the user's device may be reporting the user location as being at position 109. If, for example, road 111 was a one-way road, then a driver driving to position 109, not finding the user, and calling the user, could not simply turn around to pick up the user. Instead, the driver would have to find a path back to position 105, which in a busy city, in traffic, could take a significant amount of time and drastically decrease the driver's ability to earn money. Further, the user may simply tire of waiting and chose another ride option.

As will be discussed in greater detail herein, illustrative processes may request that the user take a brief video of the surrounding environments. This could be done in response to, for example, determining that a user's apparent location is in an environment known (from historical observation) to have margins of error above a predefined threshold. Or, for example, current weather conditions could indicate that the margin of error is historically likely to be above the threshold. In another example, a user could interact with a device to indicate that the detected apparent location is not actually where the user is standing.

In response to a request, the user may image or shoot video of a surrounding environment. So, for example, in FIG. 1, the user would take video of the environment surrounding position 105 (where the user is actually standing). Image/video processing can then be used to identify a user location relative to known, fixed objects identifiable in the images. For example, if a statue and a building feature are both known and identified based on crowd-sourced data or historic data, in an object database, recognition of both, along with 3D characteristics of both, which would only be viewable from a certain angle, can be used to determine the relative position of a user to both objects.

Some pre-processing may be done on a user device, as discussed herein, and the remainder of the object-matching may be done in the cloud, which may receive a set of pre-processed image data from the user device. Since video files tend to be large, sending pre-processed data may be beneficial if bandwidth and overall data transfer volume is a system constraint, although in certain systems the whole video file could also be sent, if the transfer capability were sufficient and permissible.

Once the process has identified the actual user location (the location relative to a plurality of known, fixed objects), the process may replace the detected GPS location with an actual user location for both a user device and for a driver/vehicle device. If the process also has identified an improved pickup location from the image data (or based on other data), the process may send that information as a suggestion to the user device and/or driver/vehicle device.

So, for example, the process may identify in environment 101 that the user is actually located at position 105, that there is available parking representing a safe pickup location at 107 (viewable from the user location) and that streets 113 and/or 103 are lower traffic streets and safer for pickup than the intersection around point 105. Any or all of these locations could be suggested as alternative pickup locations and the driver could be notified if the user acquiesces to a particular location. Also, since there is live image data available, the process could use the temporal objects to determine, for example, that parking in 107 was filled or that the streets were very busy, and in the latter case could recommend location 103 since it would not require the user to cross any busy streets as identified from the live image data. In other examples, recognized weather and other constraints may aid in a suitable location determination.

Figure 2:
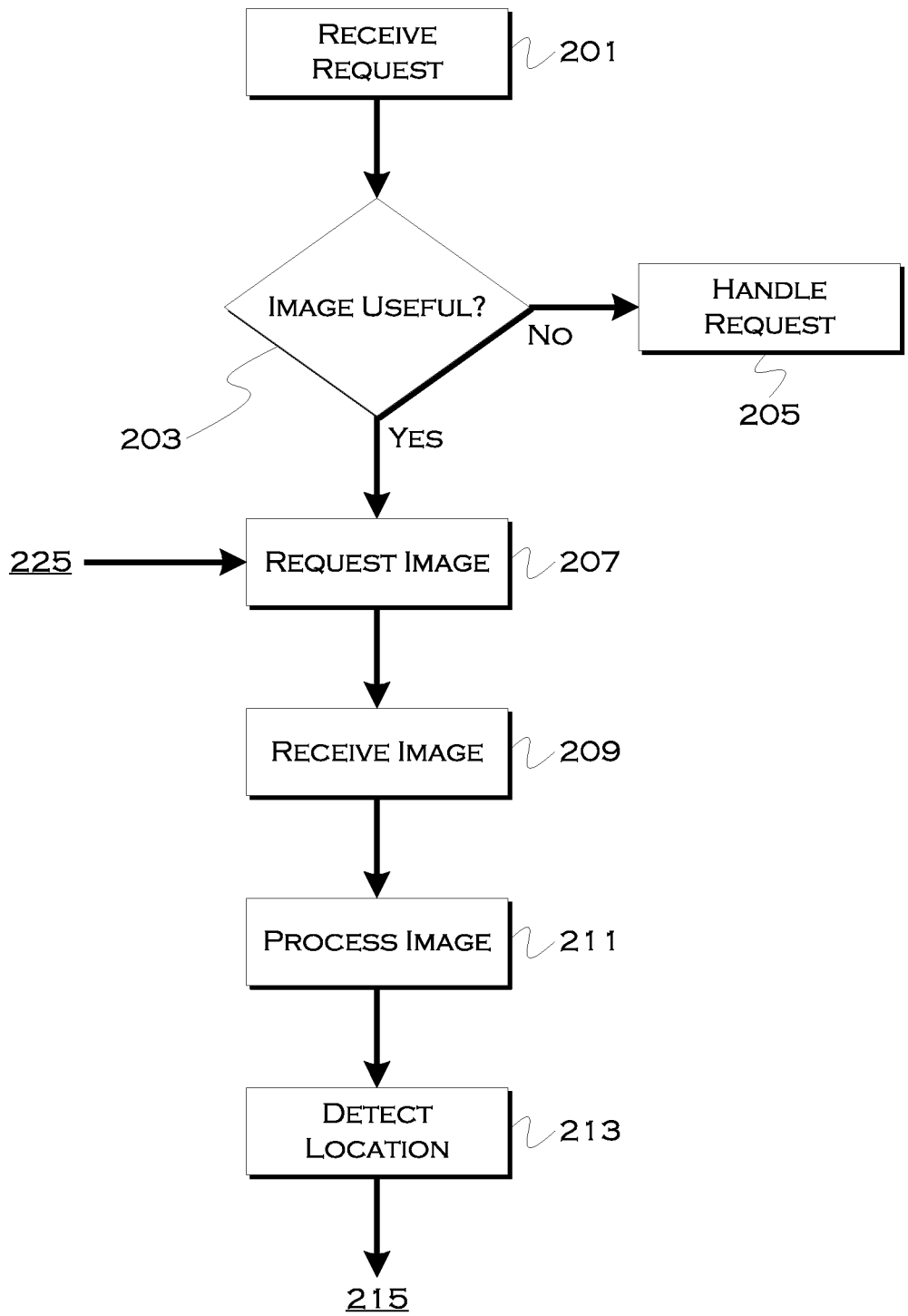
FIG. 2 shows an illustrative process for pickup request handling.
Figure 2:
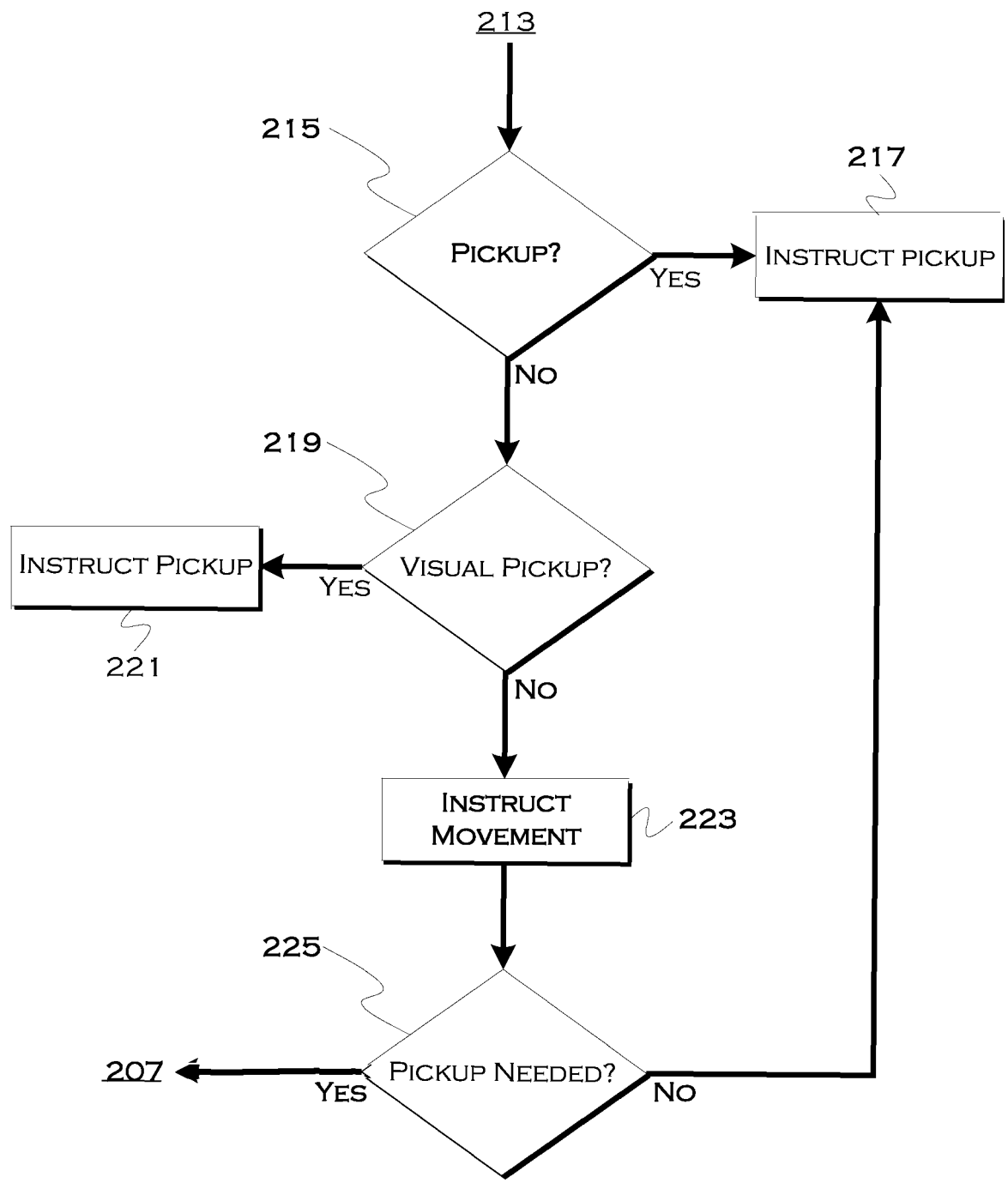

FIG. 2 shows an illustrative process for pickup request handling. In this example, a ride-hailing service receives 201 a request for pick-up. This request may include a detected user location that is detected initially based on, for example, GPS coordinates. If there is a likely margin of error associated with the GPS coordinates (e.g., they are at a location under cloud cover, they are in an urban canyon, etc), the process may determine 203 that an imaging of user surroundings may improve pinpointing of a user location. If the margin of error is slight enough, the process may simply handle 205 the request based on the detected GPS coordinates.

If the processor determines that the image will improve location determination, the process may request 207 an image of an environment surrounding a user location. This can include a plurality of still photographs, a wide-scale panoramic photograph, a video, etc. In response to the request, the process may receive 209 image data and process 211 the image data to determine a user location. In at least one example, some of this processing is done on a mobile device and can include, for example, the following.

The device performing the processing may use semantic segmentation, for example, to filter the point cloud data and the video data to remove temporal varying objects (e.g., people, vehicles) for purposes of localization. The process may also use a structure from motion algorithm to generate a 3D point cloud of the imaged environment. These objects may also be considered when determining an optimized or alternative pickup location (e.g., finding a space where the objects are not existent, or are diminished).

The process may further convert the 3D point cloud into a voxel map where key features may be identified from the image data. These key features are usable to determine a relative user position to the key features, and are further usable to reduce consideration of image data to points-of-relevance. The process may also hash key voxel features and compute an estimated user position relative to the features.

In this example, the device may perform the above pre-processing and upload the computed relative position and voxel hashes to a central server, which can use a database of object data to actually determine where the viewed features are located.

The database can include a vast array of object data, but the search can be limited to an area based on the initial detected location. So, for example, if the initial location was at position X,Y, and the projected margin of error was +100 feet, then the system could search within a circle having a radius of 300 feet around the detected location. This would, presumably, encompass both the actual user location and a number of viewed key feature points viewed from the user location. The effective goal is to avoid searching too large of a database portion, while at the same time searching a sufficient portion to find a usable enough number of the key features to confirm the user location.

Once the actual location of the key features is identified by correlation from the database, the relative user position to those key features will reveal the actual user location. So, for example, if the user is located relative to a building and a statue, once the actual location of the building and statue are known, the user's relative location will reveal the actual location of the user.

The process may also determine, based on both map data and viewed data, whether the actual location is suitable for pickup 215. That is, map data may indicate a no parking or parking zone at the location, and/or image data may indicate the presence or lack of traffic. If the user location is suitable for pickup, the process may use the user location to instruct 217 pickup.

If the user location is not suitable, the process may attempt to visually identify 219 a pickup location. If there are no visually identifiable pickup locations, the process may simply revert to using the user location. On the other hand, the process may be able to identify open parking spaces and/or low traffic or low pedestrian areas suitable for pickup, based on the presence or lack of temporal objects filtered out through the semantic segmentation. In this case, the process may instruct 223 user movement to the pickup location. Once the user arrives at the pickup location, the process may determine 225 if a new image for pickup purposes is needed. If this is the case, the process may wait until the vehicle is nearing the location, and then request a new image (to confirm the availability of a parking space, for example). If the user has simply been moved to, for example, a generally safer location, but one which is not contingent on space-availability, the pickup for that location may simply be scheduled.

Figure 3:
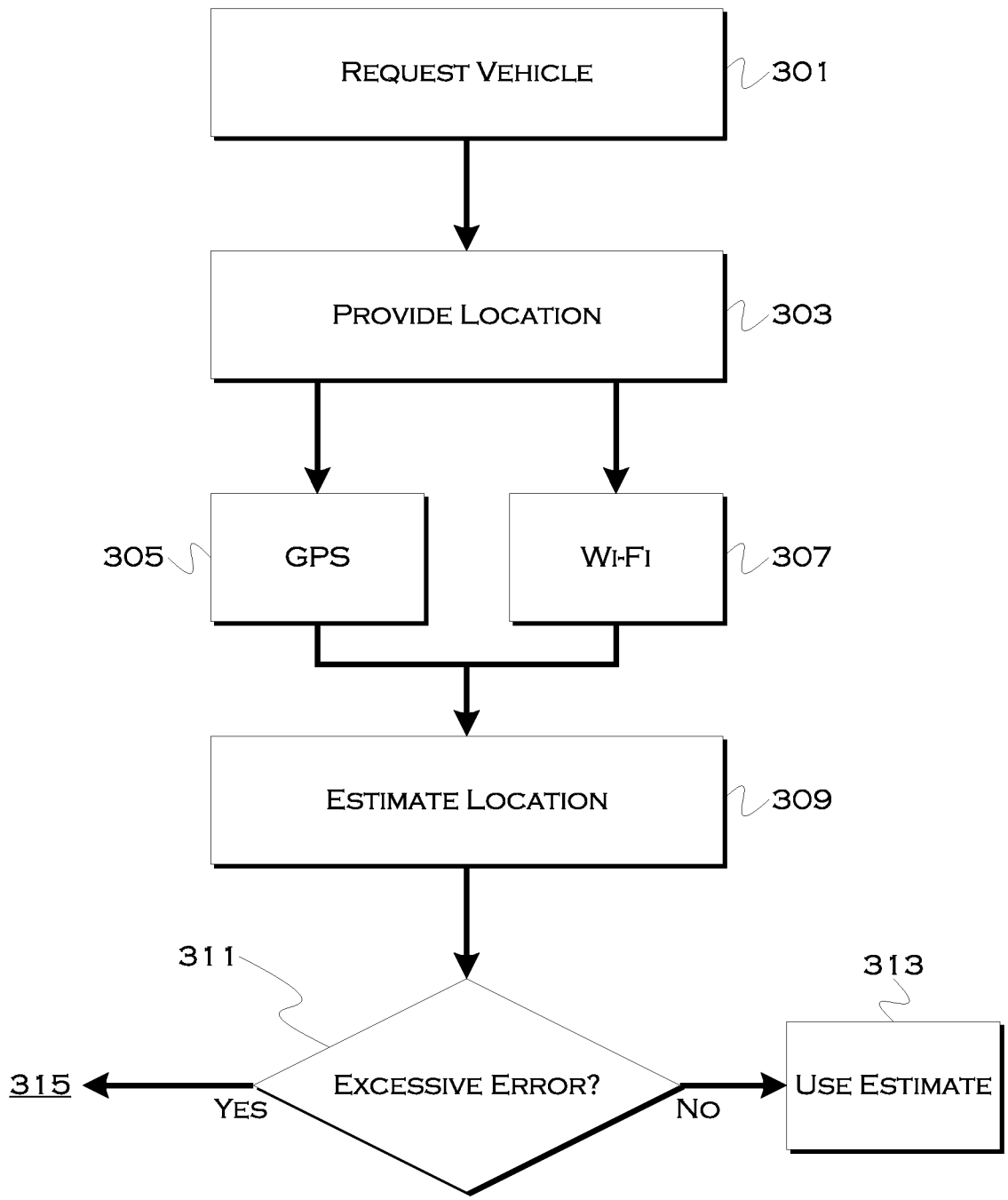
FIG. 3 shows another illustrative example of request handling.
Figure 3:
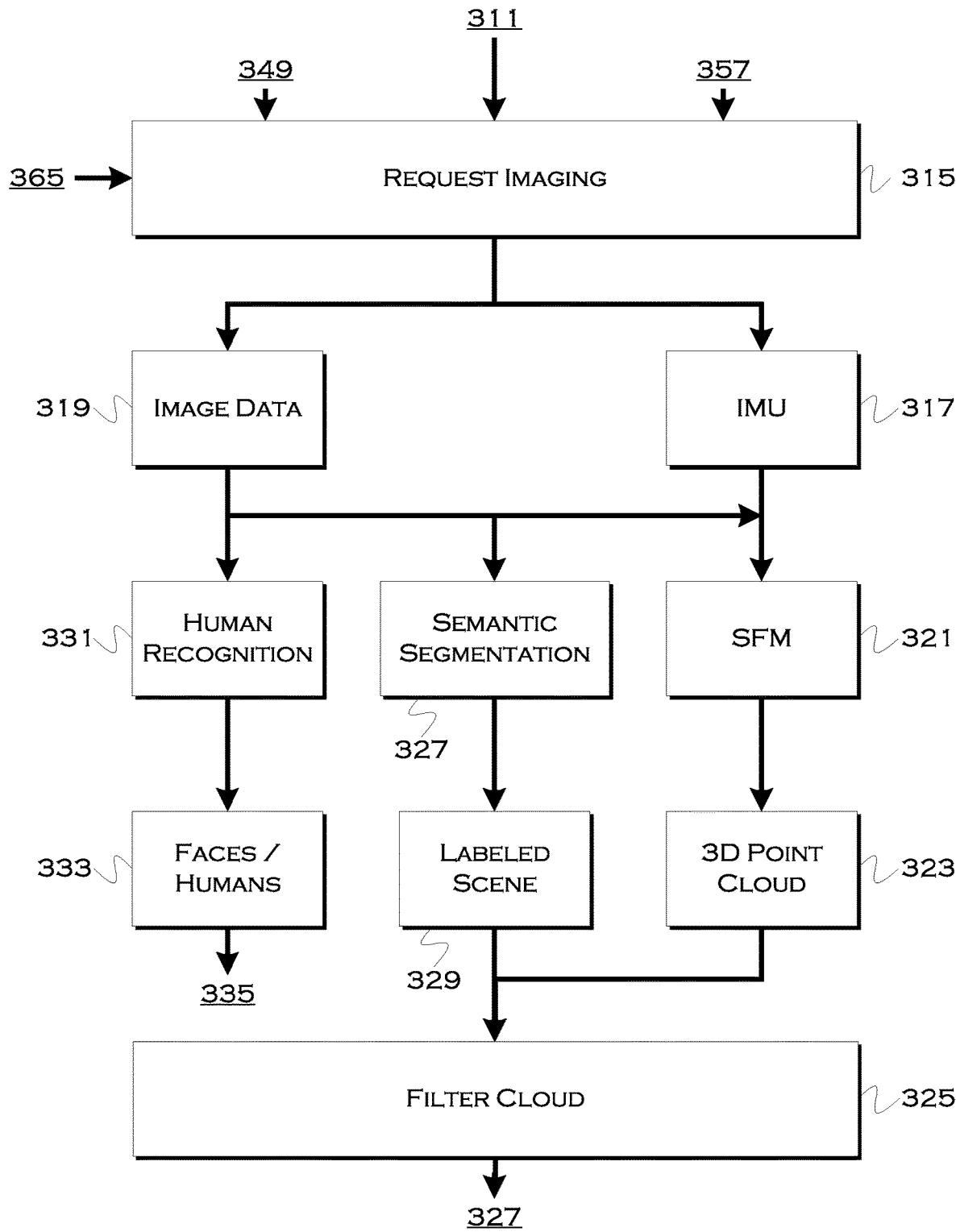
Figure 3:
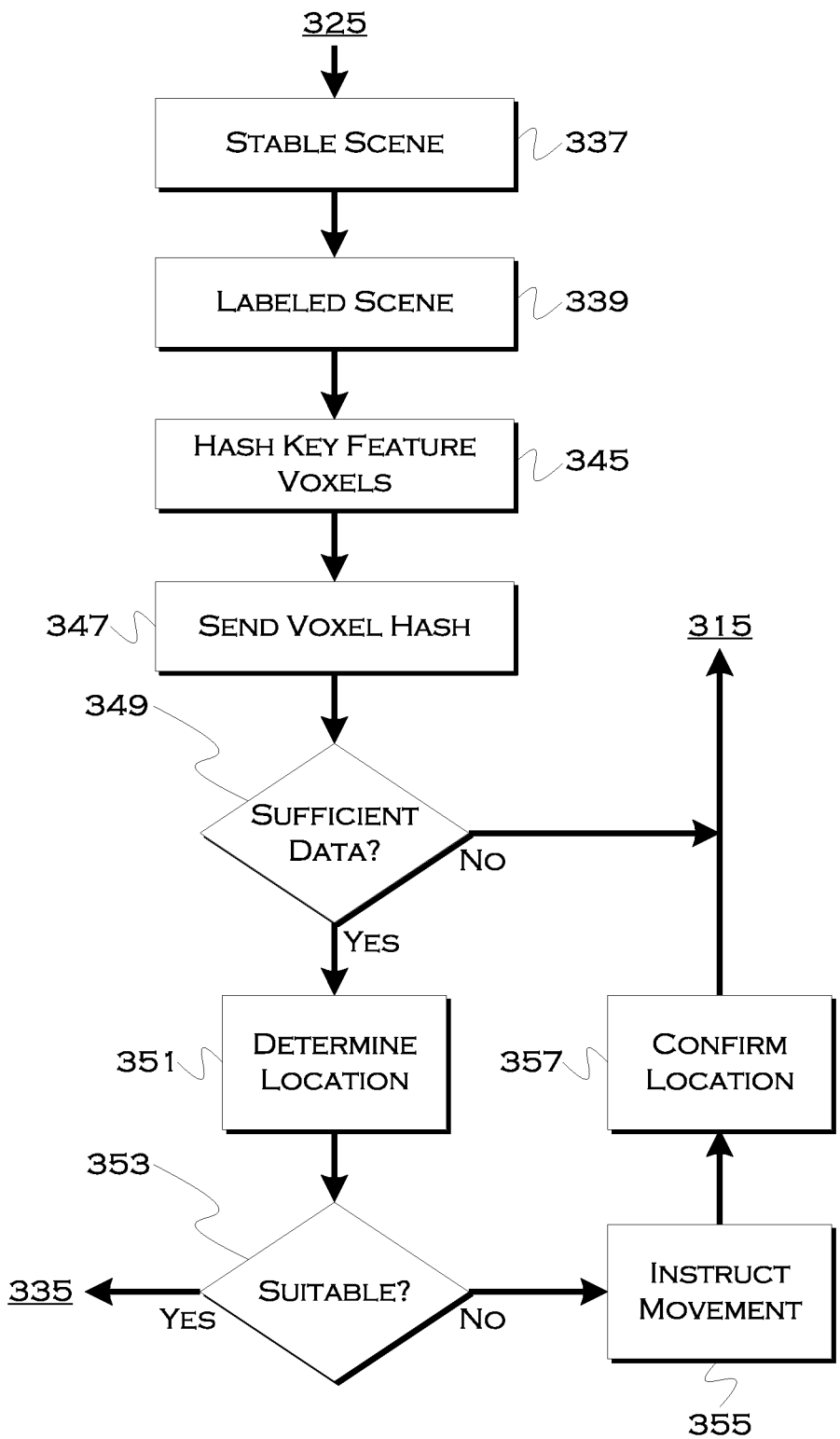
Figure 3:
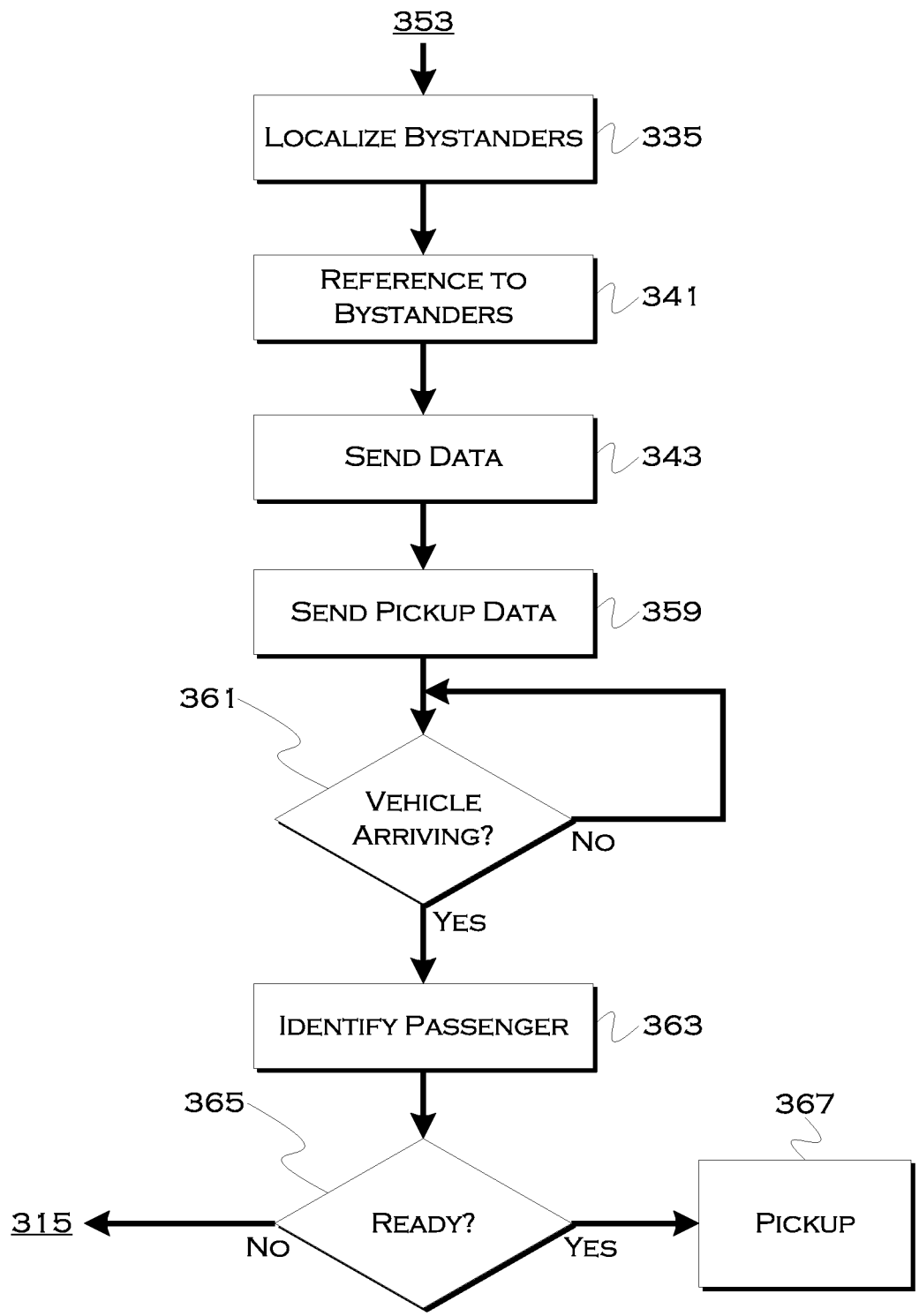

FIG. 3 shows an illustrative process that demonstrates the process of FIG. 2 in more detail. In this example, the process again begins when a user requests 301 a vehicle. This results in the user providing 303 a pickup location, which is the detected user location, for example. The process may attempt to use detected Wi-Fi networks 305 and/or a GPS location 307 to estimate a user location.

In instances where the estimated location is, for example, a location that is likely fairly accurate (e.g., a home in the suburbs), the process may simply use 313 the detected location as a pickup location and proceed. On the other hand, in instances where the location is likely to suffer from inaccuracies (e.g., bad weather, urban canyons) 311, the process may request 315 that a user scan a surrounding location.

A determination that a user may need to scan surrounding areas to image those areas may be based on, for example, location history, which can include: average GPS inaccuracy at estimated location; average delay to pick up customer at estimated location, a rate of users not located events at estimated location. Other factors could include a user history of inaccuracy (the user's device provides bad data), time of day, day of week, etc. Street activity, special events, and other data sources may capture effects of extra busy streets which might make locating a user more difficult. This data may include historical and semi-real time data obtained by other nearby user's scanning their environment to indicate level of traffic, traffic flow, parking space availability, density of pedestrians, etc. Further data may include weather events that affect GPS accuracy and Wi-Fi dataset and accuracy at location.

Business logic may also dictate whether or not the customer is asked to scan an environment. Discussed by example in FIG. 4, the business logic may generally set an upper threshold on the risk of delay and the inability to find a customer that balances the cost of requesting a customer scan his or her location. For example, a request to scan the environment may occur if the risk of delay is greater than 5 minutes or the risk of inability to locate customer is 10%. This request may also be based on the past customers agreement or refusal to scan their environment for localization.

Other factors for querying may include, but are not limited to: the user's past propensity to agree to scanning their location or moving to an alternative pick up location or high definition (HD) map information which may indicate road factors such as lack of available street parking on one or more sides of the road or other similar factors.

If a user may be asked to move, the suggested location distance compared to the decrease in pickup delay and risk of not finding the passenger may be balanced by the cost of the user annoyance to shift location. This may be set by some business logic equation. For example, a request to move N meters away might be required to save N/10 minutes of delay or more.

A request to the user to take video/images of his or her external surroundings at their present location may utilize GPS, inertial measurement units (IMU), detected Wi-Fi networks and the accompanying images generated. For purpose of generating the image, the phone may display a visual or auditory request with an instructional image or animation to help guide the user to start the scan. The cell phone may output continuing auditory or visual instructions during scanning to update the user on the progress of the scan or provide further instructions.

Additionally, the device may display recommended pan and tilt motion via auditory instructions or via displaying the scene and written or iconographic instructions (e.g., arrows) on the screen facing the user to capture missing perspectives of the current scene. The phone may provide input to the user to slow their motion or panning of the device when capturing images to avoid motion blurring. This can be accomplished by inspecting the resulting images for signs of unidirectional image blur. The phone may recommend the user to pan or tilt in certain directions based on what has been captured so far in the scanning process. The nomadic device, e.g., a cell phone, could image the region repeatedly capturing images as the user moved the phone around as determine by accelerometers to indicated a change in the pan, yaw, or other perspective and if the user is walking through the environment. In addition, as the scene changed the phone would capture additional images even within the same scene to understand temporal nature of the environment (pedestrian flow, traffic flow). Alternatively, a video image can be used.

The phone may then provide confirmation once the scene has been imaged sufficiently to produce a 3D point cloud that has captured the needed 3D scene details to try and localize the user in space. The phone may utilize accelerometers and forward and rear facing camera to determine the motion of the phone which is a composition of the user walking in space and the user moving the phone about the person to gain an adequate view of the scene.

Once an adequate image is obtained, the process may use the IMU 317 data and image data 319 to derive a plurality of aspects of the data. For example, the process may use a structure from motion (SFM) algorithm 321 to derive a 3D point cloud scene around a user.

In another aspect, the process may use semantic segmentation 327 to derive a labeled scene 329 including various temporal objects such as people and vehicles. In still a third aspect, the process may find humans or face in the image 331 to derive a composition of humans that are definitively not the user.

The temporal objects derived from semantic segmentation can be filtered 325 from the 3D point cloud to derive a temporarily stable, labeled 3D scene 337 representative of the view from the user's location.

The structure from motion and following compression into voxel hashes could occur on the mobile device in real-time. By the real-time creation of an augmented reality 3D scene the user may judge their scanning progress (for example, a split window view may show the "real" view and an augmented reality view being generated in real-time. Additionally, the voxel conversion of fixed infrastructure may be displayed on the user's device to provide further feedback on the progress and quality of localization.

The 3D point cloud data and video data will be filtered through use of semantic segmentation to remove temporal varying objects. Temporal objects, e.g., vehicles/pedestrians may be used to determine optimal alternative location for pickup.

The images used to generate the SFM 3D point cloud may include points in space that correspond to objects or visual features that vary in time. For example, people or vehicles may be captured in a recording of the area by the user, but those objects would not correspond to historical mappings of the area stored in databases and the like.

As such, sematic segmentation will be used to classify the pixels in the image corresponding to a designated class. Feature points detected in the respective images which belong to the temporally varying classes, e.g. a car, that are projected into a 3D space using SFM algorithm may be discarded or ignored. The results of this process will be to capture point clouds only from temporally stable features such as fixed infrastructure, building facades, tree foliage, and other features. This will make the process of localization far more stable in to changes in a local environment. In addition, classification of fixed objects may be used later to label the 3D point cloud, voxel map, and by extension the voxel hashes.

Temporally varying objects may also be labeled and measured. They may be directly uploaded to the central server or aggregated into a single statistic (e.g., percentage of open street parking, pedestrian density). This data may be used to determine if an alternative meeting location may be necessary.

A secondary usage for such data may be used to maintain a map of relevant features of a city environment which may be used for vehicle routing information or proactively suggesting a nearby alternative meeting location for nearby user's later request.

The point cloud may additionally be smoothed or filtered via sparse statistical based filtering such as outlier detection, neighborhood-based filtering, projection-based filtering, Laplacian smoothing, and others.

An algorithm may then convert the 3D point cloud into a voxel map 339 where key features may be identified. One effect of this step is to reduce the data transferred to a central server per each user. By converting temporally stable classified point cloud points into a voxel map (and later hashed), the process can dramatically reduce the file size.

In the aspect where people are identified, the process can localize a person's location relative to identified bystanders 335, 341. This may be useful, for example, to assist a driver, device or vehicle in identifying a user within a crowd. Since people tend to move around, such an image aspect may be captured moments before the vehicle arrives, and the driver or vehicle could use the images of who the user isn't to help identify who the user is, within a crowd of people.

This will be described later in greater detail, but generally speaking the process can transmit non-user 343 bystanders to the cloud for processing and/or transfer to the vehicle 359. This data can be used to, for example, navigate to a portion of the crowd reflected by the data (and presumably thus near the user) and viewed by the vehicle 361 and/or, for example, provide an augmented reality view of the crowd for a driver that can identify non-user entities and help the driver single out the user.

Moving back to the 3D point cloud data, the process can hash this data 345, for example, the key feature point data, and send the voxel hashes back to a central server for processing. If the server cannot use the present key feature voxel hashes to localize the surroundings 349, the scan process may repeat. Otherwise, the server may use an HD map and/or other image data to localize the key features. Once the actual locations of the key features are known, the relative position of the user, to the features (as determined based on the perspective of view of the features) will reveal the location of the user in the real world.

If this location is optimal or suitable for pickup 353, the process can use the bystander data (or request bystander data when a vehicle approaches) to localize the user at the location and to help guide the vehicle to as near a precise pickup spot as possible.

If the location is not suitable, the process can use HD maps (since the location of the user is now known with precision), and/or other data, including visual image data indicating available parking, to determine a more suitable pickup location 355. This can include a safer location, a location with fewer pedestrians or vehicles, an open parking space, etc. This can also be confirmed 357 with the customer.

As the vehicle arrives, the process can enact filters to sort out visually identified non-users (e.g., in an augmented reality display) 363 and also determine if the customer has moved 365. If the customer cannot be found or appears to have moved (which can also be indicated by phone accelerometer data), the process can repeat the scan process. In at least one example, the localized phone processing and reduced cloud-sent data size results in fairly fast processing, so it is not unreasonable from a time perspective to ask a user to re-scan and process the image, even if the vehicle is arriving or has arrived.

Figure 4:
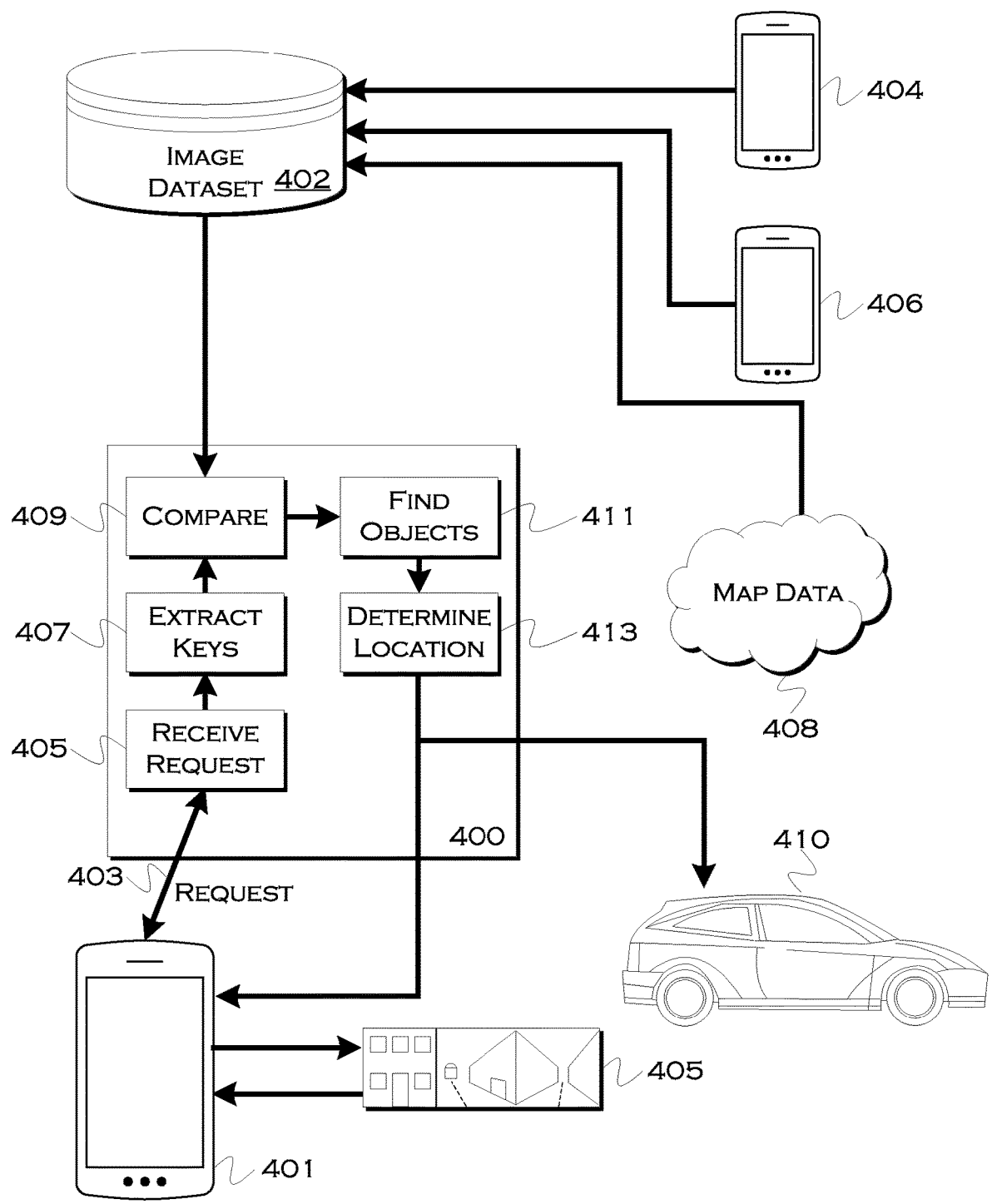
FIG. 4 shows an illustrative system for request handling.

FIG. 4 shows an illustrative system for request handling. This is one example of how the data may flow between entities and sources for various data used in illustrative solutions. In this example, a user or passenger has a mobile device 401 that is used to initiate a request for pickup 403. Since the remote system 400 may require improved location information, the request communication may require back-and-forth communication.

When the remote processing receives the request 404, it can determine if a better location is needed, and, if so, instruct a user to image the surroundings. The user can use the mobile device to scan an image, series of image or video 405 of surroundings. Further, as noted herein, the device may perform some preprocessing on the image before sending the image back to the remote server 400.

Once the server receives, in this example, key image elements as hashed data, the server can unpack the data and extract 407 the key feature elements. In a large image dataset 402, there may be many key features that seemingly replicate. Thus, searching the entire image dataset may produce many results for a key feature. On the other hand, if the remote system searches in localities around the initial projected location, the set of data actually considered may be greatly reduced. Further, because, while a certain feature may appear to replicate, multiple features identified in the received data will typically only be present at a single location. E.g., a building feature may replicate, but there may be only one coincidence of the building feature viewably proximate to a statue feature. Data from various other users 404, 406, as well as HD map data 408, can be used to build the large data set, and the objects in the dataset can have both key feature comparators and physical locations associated therewith. The physical locations can serve as a constraint on the searching, for comparison 409 to the extracted key features. The physical locations can then, when a match is found, be used to physically locate the objects to which the features correspond 411.

By knowing the location of the user relative to the objects (received from the user device, in this case), the remote system can determine an actual user location by extrapolating a relative location to the now-identified physical object locations 413. This actual location can then be sent back to the user to improve the onsite location, as well as be sent to a requested ride 410.

Figure 5:
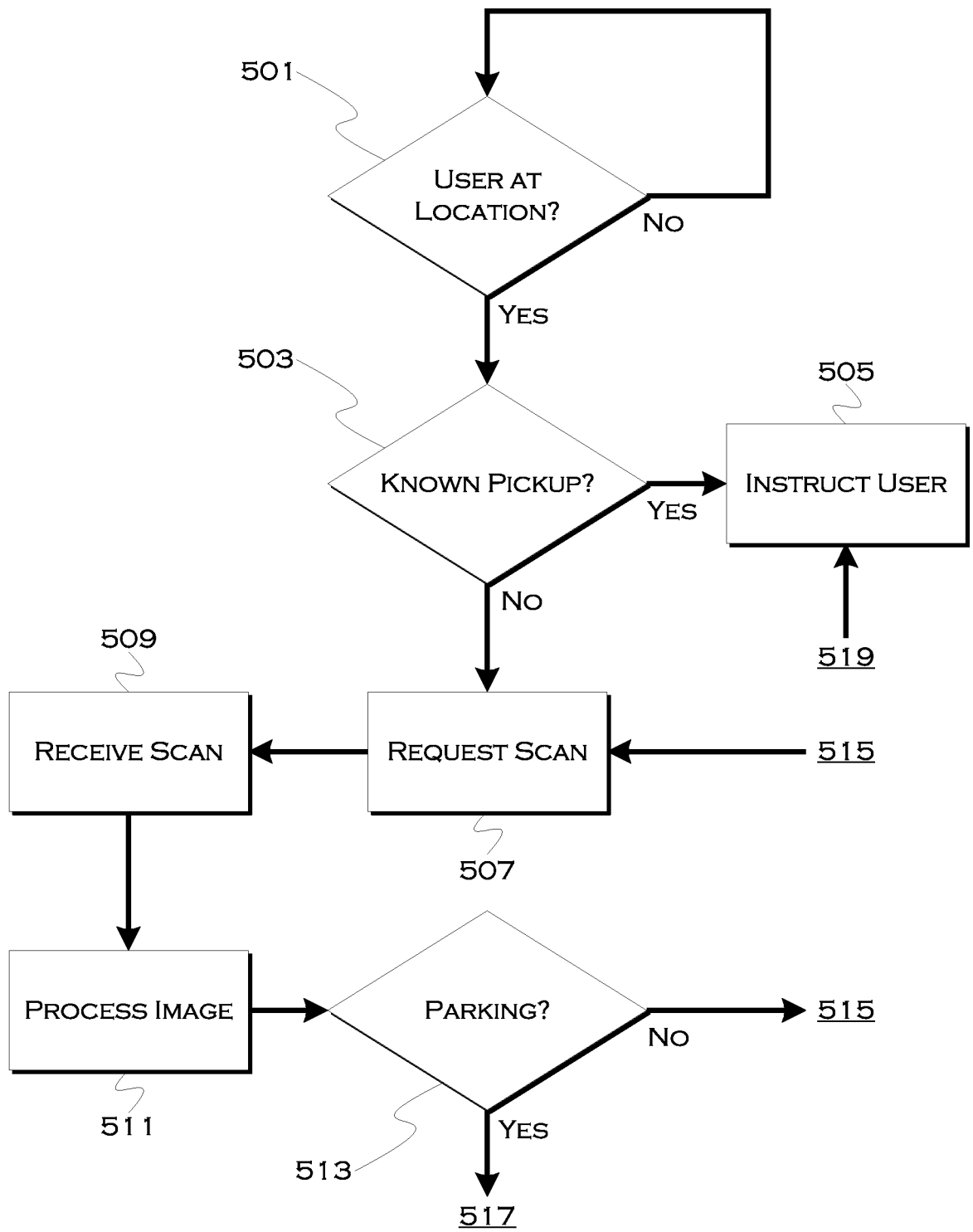
FIG. 5 shows an illustrative example of a pickup location selection process.
Figure 5:
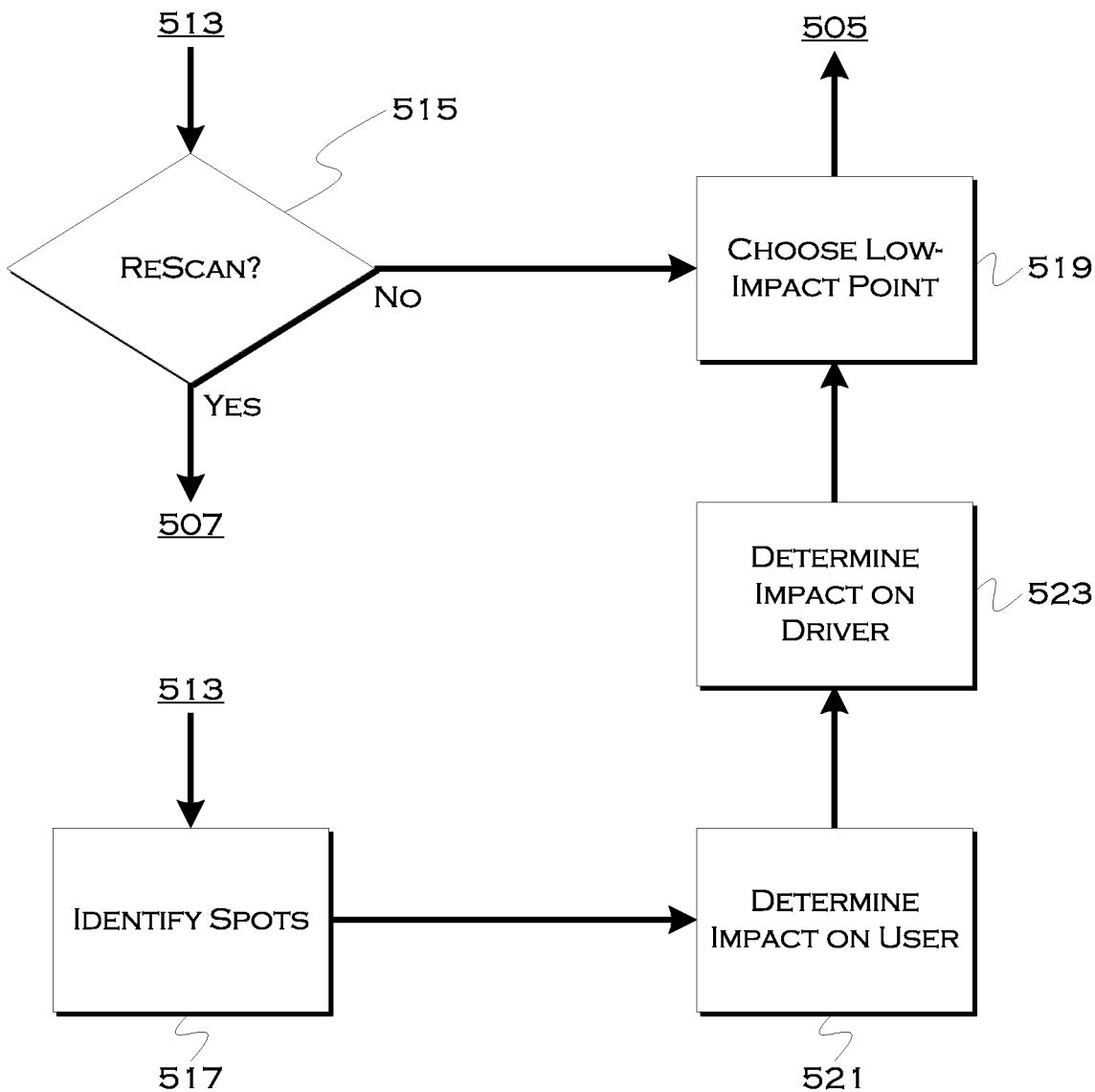

FIG. 5 shows an illustrative example of a pickup location selection process. In this example, after a user location has been accurately assessed, the process may attempt to determine if there is a better location for pickup. Better locations can include, but are not limited to, locations which are more accessible for a driver, locations which will significantly diminish servicing time, locations which are safer for a user/driver, etc.

In this illustrative example, the process may determine 501 whether the user has been located at a defined location. That is, if the margin of error on the location is still high (e.g., the user is using detected GPS coordinates in an urban canyon), the process may wait until the other illustrative embodiments, or the like, have been used to accurately locate the user's true present position.

If the user's location is verified, the process may determine 503 if the present location includes a known pickup location (e.g., a designated or safe pickup zone) or is near a known pickup location that may, for example, be a location constantly cleared of waiting traffic so that rideservicing vehicles can pickup users. If such a location is nearby, or if the user's present location is such a location, the process may instruct the user to travel to the pickup location or wait at the already designated pickup location that is the user's present location.

On the other hand, if the current location is not predefined as a safe or known pickup location, the process may request 507 a scan for parking locations. This could be a resending of the original scan used for locating the user, or this could be a new scan that may include, for example, a better perspective of street-level temporary objects (e.g., people and vehicles). For example, an initial scan may have been aimed higher at building and landmark features, and the new scan may be aimed at eye-level to better identify parking spaces. Fundamentally, the image processing techniques still apply for isolating temporary objects such as vehicles and people, but in this case, instead of being discarded, as may have been the case in the user-location embodiments, these temporary objects can be used to identify places where, for example, vehicles are parked, people are or are not clustered, parking gaps occur, high traffic exists, etc. These and similar factors can aid in decision making with regards to safely choosing a location for passenger pickup.

In this example, the process may receive 509 the scanned image, which in many cases will have had some preprocessing performed thereon by the user's mobile device. In this example, for instance, the process may receive the IMU data, temporary objects (vehicles or vehicle and people), and one or more key feature identifiers. The key feature identifiers may be included to assist in identifying a parking space position relative to a key feature, but the IMU data and temporary vehicle data may also be sufficient to identify parking. Also, in some examples, this second scan may be performed when a driver is close to arriving, to ensure the likelihood that an identified parking space is actually still vacant.

In still further embodiments, a requesting server may ask a user, through device instructions such as text, speech or visual guides, to ensure inclusion of certain areas known or likely to include possible parking. These areas can include spaces where pickups were previously successfully performed (and noted by a database) or where map data indicates parking should exist.

The remote server may process the image to physically locate parking spaces, which can include, for example, identifying map-data based parking spaces and confirming that there are no vehicles within those spaces, or processing the image to identify 513 gaps between parked vehicles. If there are presently no parking spaces identified, the process may repeat 515 until parking is identified.

In other examples, the process may handle the image to identify high/low traffic areas and high/low pedestrian areas. This information can be useful to, for example, place a person in a position where there is a limited crowd of people (to make individual identification easier), ensure that a person is not asked to cross heavy traffic, if avoidable, ensure the person is waiting near a crowd of people (if safety is an issue), etc.

If the process is able to identify an area suitable for parking, the process may further identify 517 vacant spaces within the area. Again, this can be done strictly from the image data, or this may be done using a combination of image and map data, looking for gaps in the image data where the map data indicates parking should exist. This sort of image processing may also be useful to identify temporary impediments to parking, such as construction or a roped-off area, where the map may indicate parking is available. This can help ensure that a user is not directed to an unsafe or unsuitable area for pickup.

In addition to identifying potential spaces, for one or more spaces (or until a suitable space is determined), the process may identify 521 the impact a space would have on a user, and identify 523 the impact a space would have on a driver. This can be useful to determine that a given space is unsuitable for a variety of reasons not related to the immediate availability of the space, such as requiring a user to walk in rain, cross a busy street at night, or require the driver to take a long detour to reach the location. If the impact on each entity (or each entity that a provider cares to accommodate) is suitable, the process can choose 519 a low impact point and instruct the user and driver to meet at that location.

Figure 6:
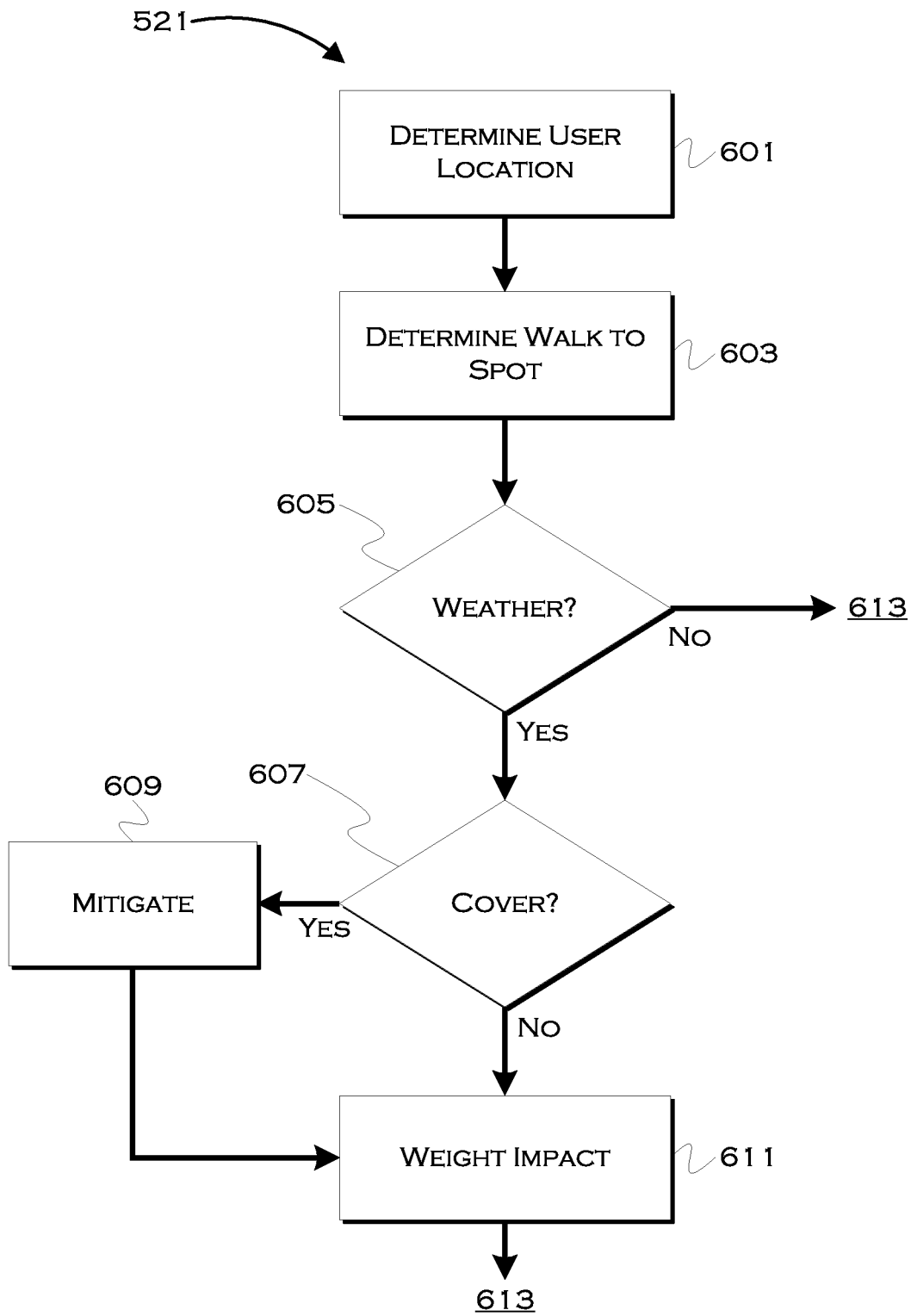
FIG. 6 shows an illustrative example of a user-impact determination process.
Figure 6:
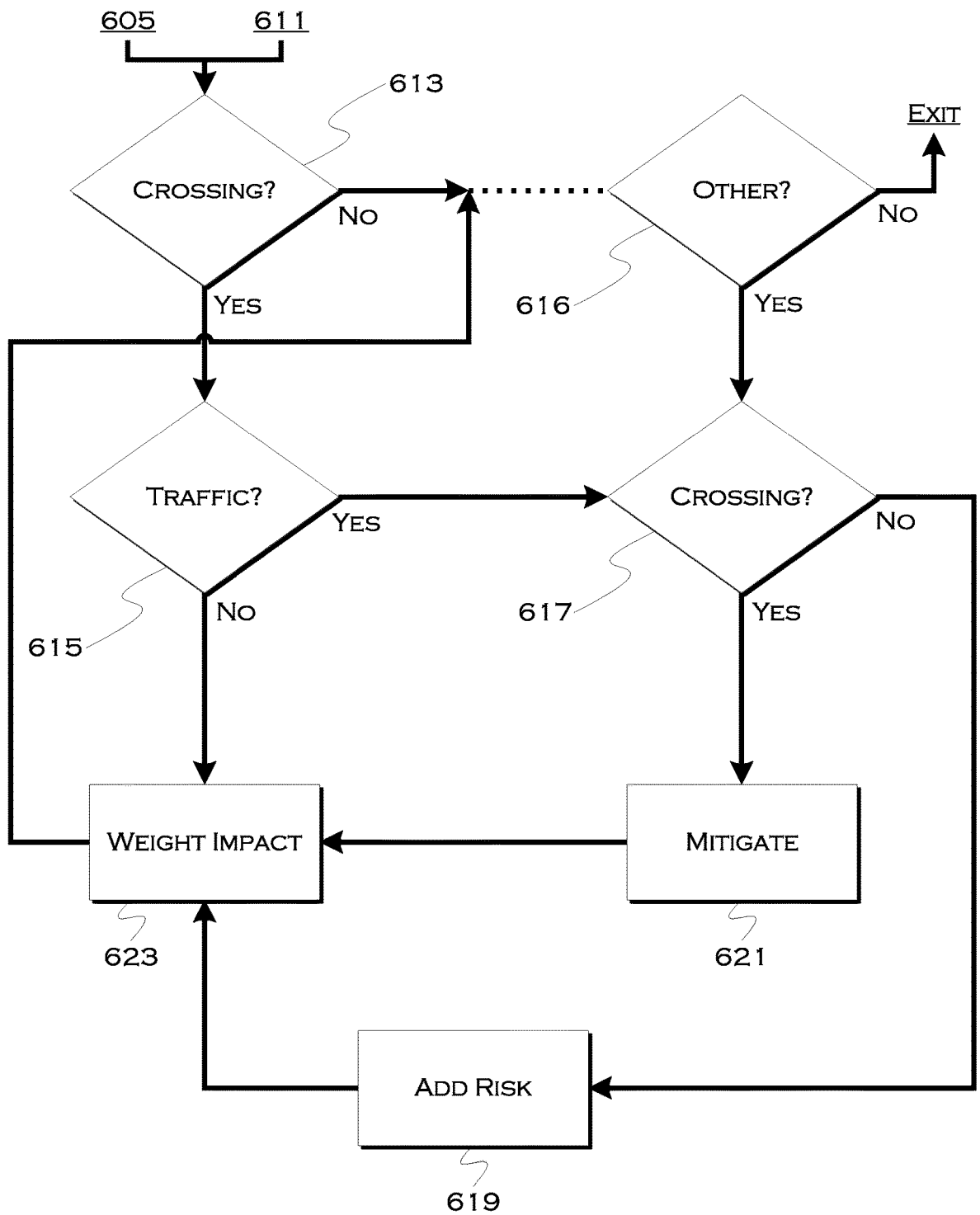

FIG. 6 shows an illustrative example of a user-impact determination process. In this example, the process considers the impact of traveling to a new location on a user. That is, assuming the user has minimal impact by waiting at the current location, the process determines what increased impact will or may occur from events such as, but not limited to, crossing traffic, traveling distances, ongoing weather, etc, dangerous walking conditions, etc.

In this example, the process may utilize 601 an accurately determined user location as the user's present location, and then determine 603 a likely or plurality of likely walking path(s) to a suggested user location. Once the path(s) are determined, the process can begin to calculate a weighted impact. Certain constraints, for example never requiring a user to travel more than 100 feet in excessive precipitation, can also be limiting factors, and can be used to constrain suitable walking paths or stopping space (where the vehicle stops) selection.

In this example, for illustration only, the process determines 605 if there is currently (or projected to be, upon arrival) inclement weather. This could include snow or rain, but could also include cold, hot, icy, etc conditions. For example, if a user had to walk down a steep hill, it might be very undesirable to require this in icy conditions, even if there was no precipitation. On the other hand, heat or humidity might be a constraint if the user had to walk up that same hill.

In this example, as an instance of a possible mitigating factor, the process also determines 607 if there is cover for some or all of the proposed walking path. This can be used as a mitigating factor, and may be determinable from historic, map or image data, or a combination thereof. Cover can include full cover (and indoor path) and overhead cover. Any mitigation (e.g., areas where the walking path is largely unaffected by the weather) can be applied 609 and then the process can weight 611 the user-impact of the weather. For example, if a walking path was 400 feet, and a constraint was no more than 100 feet in the rain, and it was raining, but 350 feet of the path was indoors, then the process could mitigate the impact of weather for all but 50 feet. There may be a bound on maximum walking distance that is still met, but the weather only impacts a portion of the walking path and thus can be treated as such.

Other examples include, but are not limited to, street crossings 613 along the path. If the user has to cross one or more streets, the process can determine traffic 615 (from the image data, for example) and can also determine if there is a usable crossing 617. This can also be determined from the image data or from map data indicating the crossing. Real time traffic data can be used to determine traffic, but the image data may be more real-time in terms of the immediate locality of the user and what the user has to confront when crossing the street. If there is traffic but is no intersection, for example, the process may add 619 a risk factor or can remove the crossing from consideration altogether. If there is a crossing, the process can mitigate the impact of traffic 621, and again, the process can weight the impact of the crossing 623 on the user. This consideration and mitigation process can continue until all suitable user-impacting factors have been considered.

Figure 7:
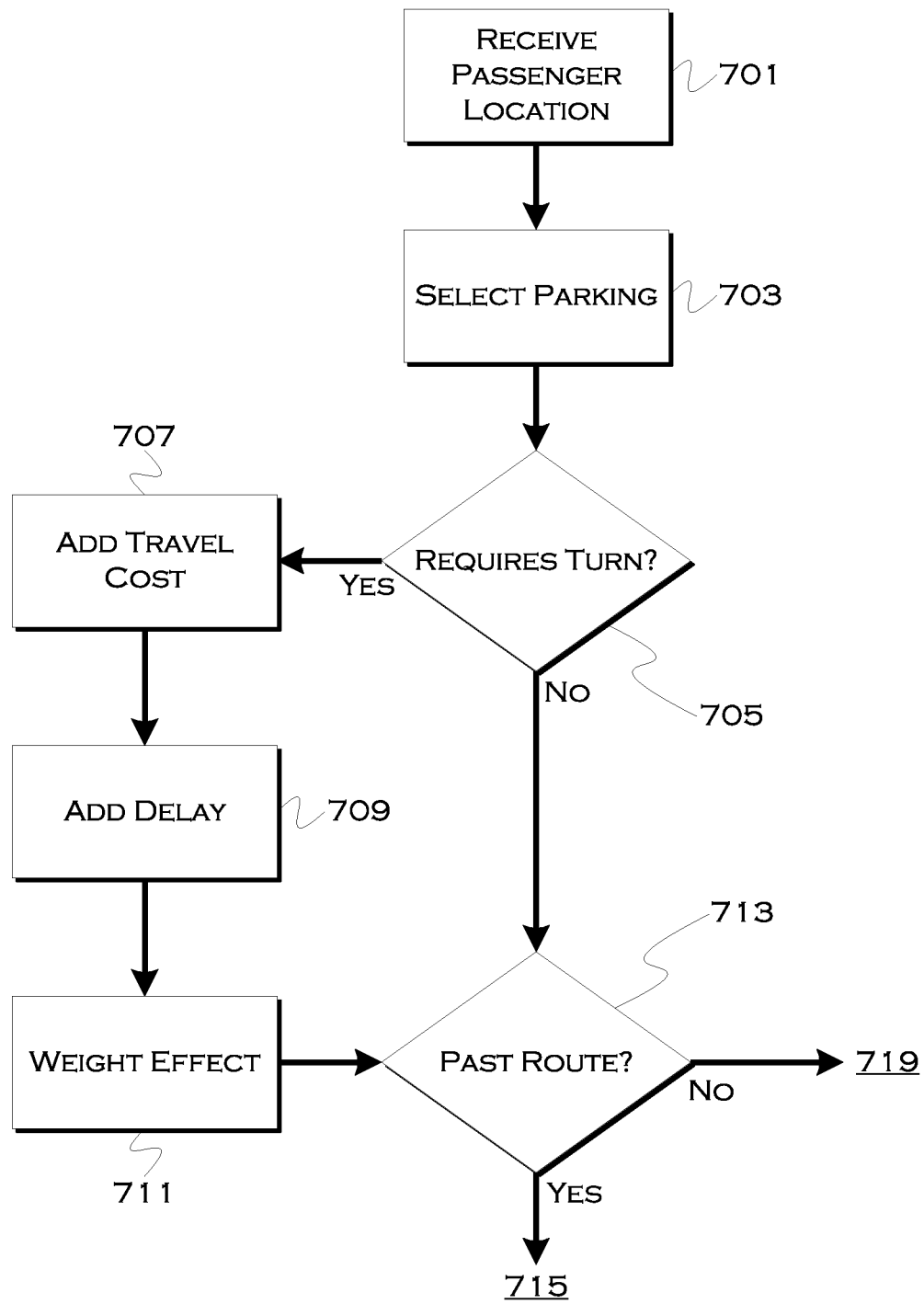
FIG. 7 shows an illustrative example of a driver-impact assessment process.
Figure 7:
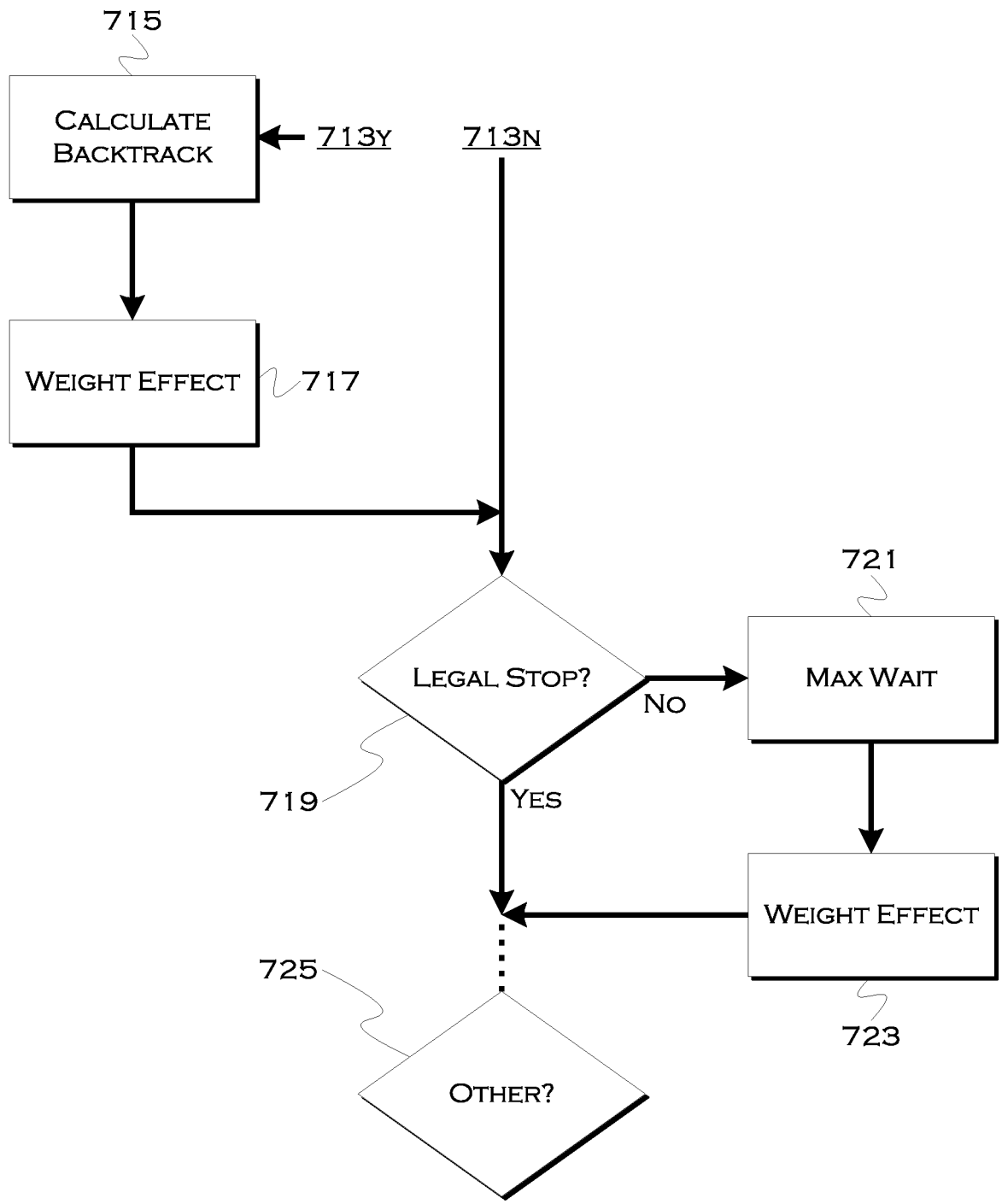

FIG. 7 shows an illustrative example of a driver-impact assessment process. Similar to the passenger-impact process of FIG. 6, this illustrative example demonstrates how the decision engine may consider an eventual impact on a driver.

In this example, the process has one or more eventual potential stopping points in mind. The initial stopping point considered may be a user location, it may be a point selected by viewing the user-generated image, or it may be one or more points selected with user-impact in mind, such that the point(s) reflect points acceptable from a user perspective. Whether the process considers driver impact first, user impact first or both simultaneously, the process is capable of finding points that fit within constraints for either party, constraints for only one party, or a minimized constraint set for one or both parties (e.g., minimize total impact by comparing user+driver weighted impacts for each possible stopping space).

In this example, the process receives 701 a passenger location. This location can be the actual location of the passenger and/or it can include one or more possible passenger relocation sites (e.g., stopping spots). The process can either select 703 one or more received potential stopping spots from the received points, or use the actual passenger location (and passenger image data and/or map data) to select points for consideration as possible stopping spots.

For each stopping spot, or until a suitable stopping spot is found, in some examples, the process may consider 705 the impact of stopping on the spot relative to the driver's present location and relative to picking up the passenger at the passenger's present location. Put another way, the driver would necessarily have to travel to the passenger's present location if no change were made, so the impact is the difference (from a time, fuel, safety, etc) perspective in a new spot vs. the passenger's current location, or a new spot vs. a preferred or optimized passenger location.

If the goal is to merely minimize the impact on a passenger, then the only consideration may be whether the best spot for the passenger does not exceed any driver constraints (e.g., requiring a 20 minute detour for an otherwise 5 minute pickup). On the other hand, if the goal is to optimize the pickup for both parties or considering the impact on the driver to at least some extent, the process may consider impact-increasing factors such as, but not limited to, turning, backtracking, maximum stopping times, etc).

If, for example, the process requires one or more turns 705 that may add additional travel time and/or distance (e.g., the driver and passenger are both presently on the same street, but the safer pickup spot is across the street), the process may add any additional fuel 707 expected to be consumed and/or additional delay 709 that may be experienced as a result of moving the location. This consideration can also weight in favor of the driver, for example, by considering a location that requires less travel time or less fuel to achieve, but then which likely requires the passenger to change locations to some extent.

The process can factor in the increased/decreased time/ cost and weight 711 an impact resulting from the additional turns (or fewer turns) required by the journey. These would primarily include extra left turns, which, in the United States, often require longer waits, but any turn increasing the travel time or any prevention of a turn decreasing the travel time could be factored in.

The process may further consider whether the driver must actually travel past 713 the alternative pickup spot (e.g., another location or the present passenger location) and then loop back and backtrack back. Because of divided roads, traffic, construction and one-way streets, moving a destination across a road may have a significant impact on a driver, even if it has a minimal travel impact on a passenger. Thus, the process can consider 715 the amount of back-tracking required and can then weight 717 the effect of this accordingly. As with the turns, this calculation can also be in favor of the driver (e.g., moving a location requires less, not more, backtracking) so the weighting can reflect this in a given calculation.

In still a further example, the process may consider whether the new location represents a legal stopping location. While it may not necessarily be illegal for a driver to pickup a passenger at a non-parking location, it may be illegal or discouraged for the driver to wait more than a certain amount of time at a given location. This could be a literal constraint on the system (e.g., if the driver will arrive in 5 minutes, the passenger has to walk 10 minutes, but the legal wait is 2 minutes, the stop is potentially unsuitable) or this could be an impact effecting constraint. If the constraint is not legally prohibitive, but there is not an excessive wait time available as there would be with a legal parking space, the process can consider a maximum 721 (known from map data or historically observed) stopping time associated with the proposed stopping point, and can weight an effect 723 this would have on the overall system. This could be a risk constraint, for example, which weighs the likelihood a driver will be forced to move as opposed to a cost constraint that considers extra fuel or travel time. With cost constraints, the system may seek to minimize cost or keep total weighted cost below a threshold. With risk constraints the system may seek to minimize risk or keep total risk below a threshold. Aggregation of variables may also be useful, e.g., there is a 33% chance a driver will be asked to move from a spot that costs $3 to pickup from, in terms of time, travel and fuel, and a 0% chance with a spot that costs $5, which would be the alternative to the $3 travel space, but which requires an extra $3 of travel from the $3 travel space if the driver is forced to move. So there is either a 100% chance of spending $5 in travel or a 66% chance of spending $3 in travel+a 33% chance of spending $6 in travel ($4 expected cost), making the risk of moving worthwhile. On the other hand, if there is a 5% chance that the driver will also receive a $100 ticket for waiting for too long, the driver is better off going to the $5 travel space, assuming the calculation is passenger agnostic in terms of impact on the passenger.

This and similar considerations can be used to identify one or more optimized parking spaces, assisted by user imaging, and consider the impact of those spaces on passengers and drivers before selecting an alternative to a present user location as a recommended space.

Figure 8:
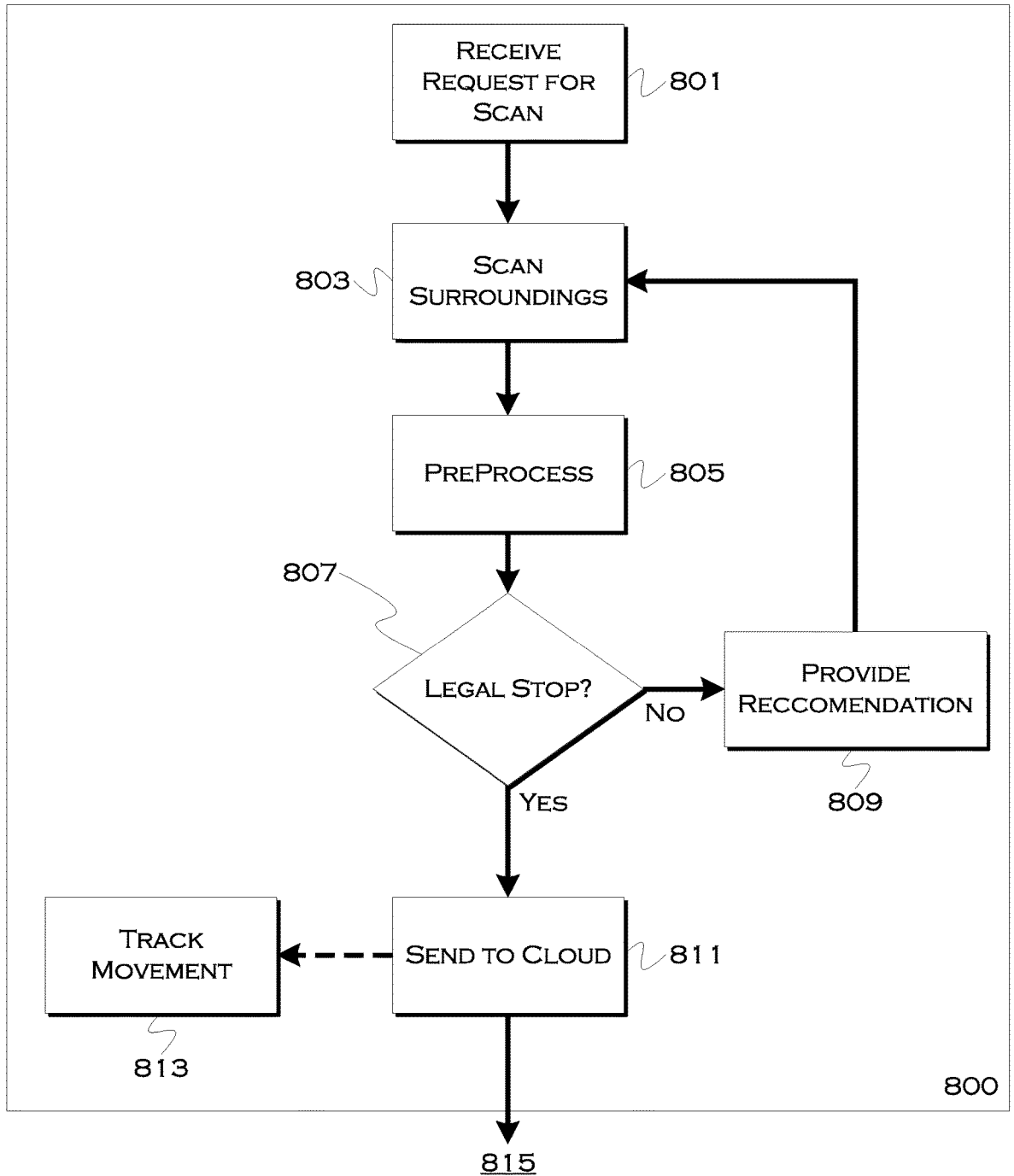
FIG. 8 shows an illustrative process for user identification, across a variety of exemplary platforms.
Figure 8:
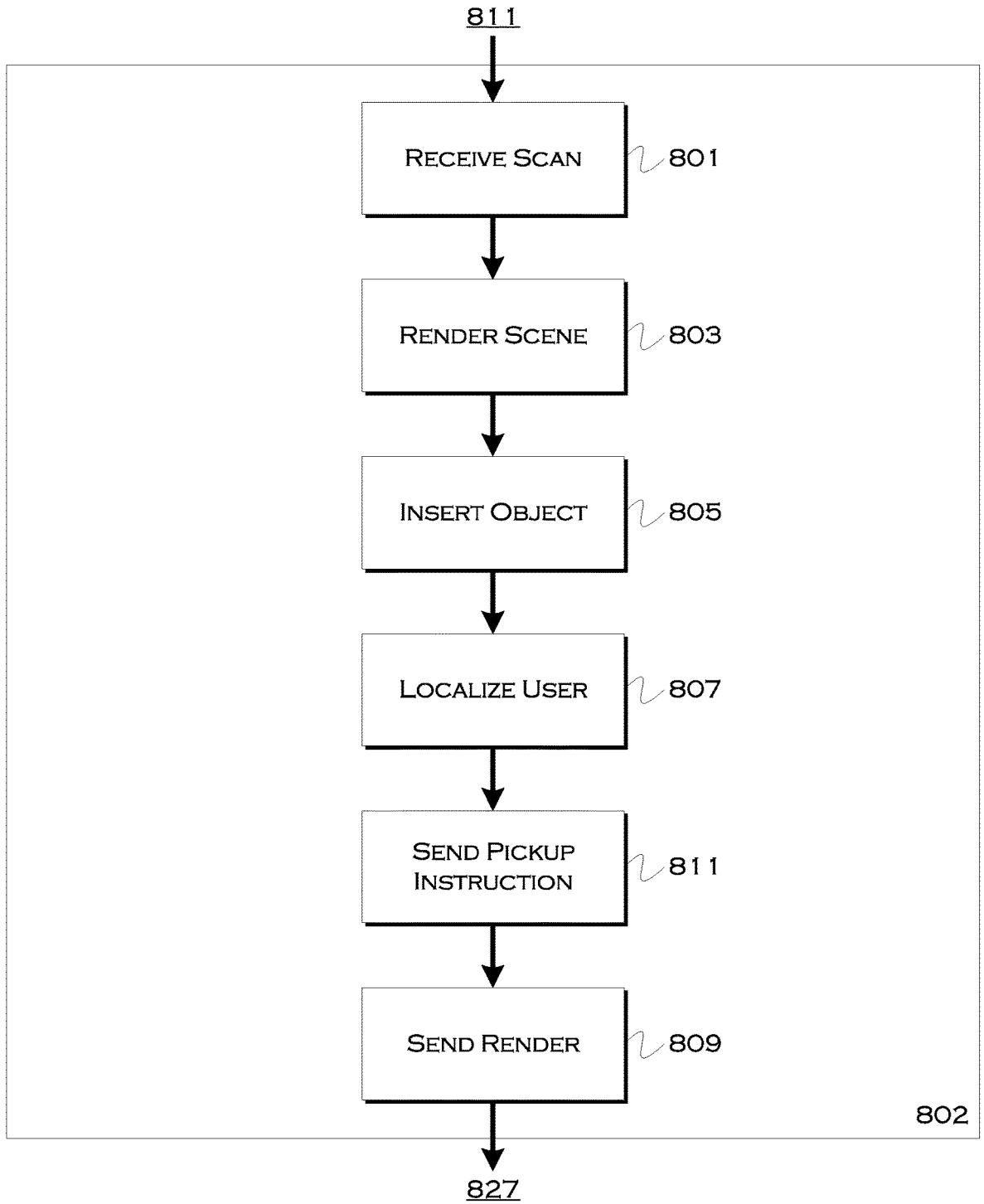
Figure 8:
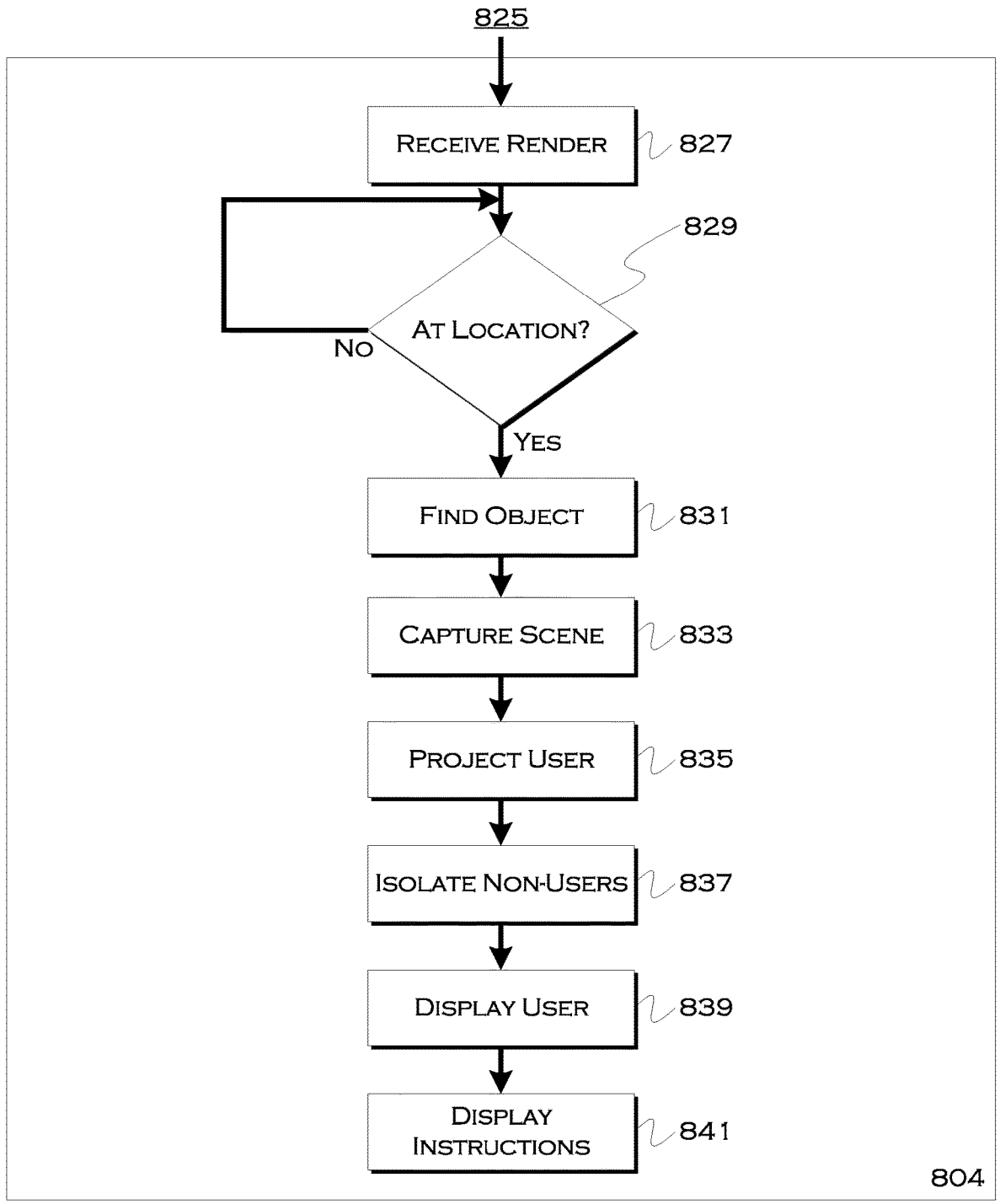

FIG. 8 shows an illustrative process for user identification, across a variety of exemplary platforms. In this example, there are several platforms, that perform exemplary processes, but it is understood that suitable corresponding process can be performed on other platforms involved in the process as needed or appropriate. In this example, there is a user phone 800, a cloud server 802 and a driver phone 804.

In this example, the user phone receives 801 a request to scan surroundings. This may be part of the initial request to attempt to determine a user location, but also may be received again when a vehicle is approaching, to limit the changes in the localized scene before the vehicle arrives. In response to the request, the user may scan 803 surroundings. This may be a more localized scan than a previous one, focusing on nearby objects and/or nearby people, as the image may be used to pick the user (as a focal point) out of the localized environment.

Once local imaging has been completed, any preprocessing 805 may be done on the local device. This can include steps similar to those previously discussed, or other similar preprocessing designed to extract and compress key image elements for transmission to the server. Since there is not necessarily a comparison of key features necessary, the phone itself may be capable of converting the imaging into a scene of reduced elements, usable for both transmission and identification of non-user elements such as local objects and non-user entities. If bandwidth and/or transmission times are sufficient, the whole, unprocessed image could also be sent, as is the case with the previous embodiments.

In this example, the phone attempts to determine 807 if a localized fixed object is present. This can be, for example, a tree, a fire hydrant, a bus stop, a street sign, a door, a store window, etc. In some examples, the system may require an object of a known height or size, or even a full top to bottom view of the object, so that the distance and/or angle of the user to the object can be calculated based on the known quantities. In other instances, other height or distance calculations may be used, thus allowing utilization of objects such as trees. If there is no suitably localized fixed object usable for a relative position determination, in this example, the process may provide 809 a recommendation (e.g., "please include a street sign, light or street feature") as to what should be included, and then the user may rescan the image. Also, in other embodiments, the local object may not be used or required, and thus this step may be foregone. In those instances, the user may be localized with respect to a further object or simply with regards to other local pedestrians.

The process then sends 811 the information to the cloud, where the cloud 802 receives 815 the information from the user device. The cloud can, in this example, create 817 a render of a scene for use by the driver, if so desired. The process can insert 819 a rendering or representation of the localized object. This scene, including the object, can be viewed by the driver and may also include 821 a representation or image of the passenger placed relative to the localized object. Thus, a driver viewing the scene, even if the scene is a virtual rendering, will be able to appreciate where the user may be located relative to the object.

The system can also send 823 pickup instructions to the driver, including any visual data or rendering 825. The pickup instructions may be audible or visual, such as text reading "the passenger is located six feet to the left of the bus stop," "the passenger was recently standing next to a person in a blue coat and a person in a red hat," or "the passenger is standing to left of a tree and to the right of a person in a blue shirt." The rendering may show the objects, either recreated from the scan data sent to the server or replicated by digital equivalents, which may be generic forms of the objects (e.g., a predesigned tree or stop sign).

The driver receives 827 the instructions and/or scene, and determines 829 if the vehicle has arrived at or whether a vehicle/device camera can see the location. Once the camera can see the location, the process attempts to find 831 the object. The camera will be viewing the object from a different perspective than the user, but based on the location of the vehicle, the user, and the data known from the user's scan of the scene, the vehicle should be able to determine which object in the image is the same object (or objects) surrounding or near to the user.

The process may capture 833 the scene, from the perspective of the vehicle, and including the object, and then attempt to project 835 the user's location within the scene. So, for example, if the vehicle views a bus stop head-on, and the user has been digitally located six feet to the west of the bus stop by the user's device or server, the vehicle/device camera of the driver may place a marker six feet to the west of a bus stop in the captured scene, or may select one or more people approximately six feet to the west of the bus stop as candidate passengers.

Also, in this example, the process may have information about one or more non-user entities (e.g., bystanders), also obtained from the user imaging. Using this data, the process can isolate 837 some or all non-user entities based on the data. The system could place augmented reality markers on the non-user entities, place a marker over or on suggested possible users 839, or otherwise highlight or identify candidate users in the scene, located where the user is expected to be located, thus improving the ability of the driver to quickly locate the user. Any instructions can also be displayed 841 or played if the instructions are audible.

Figure 9:
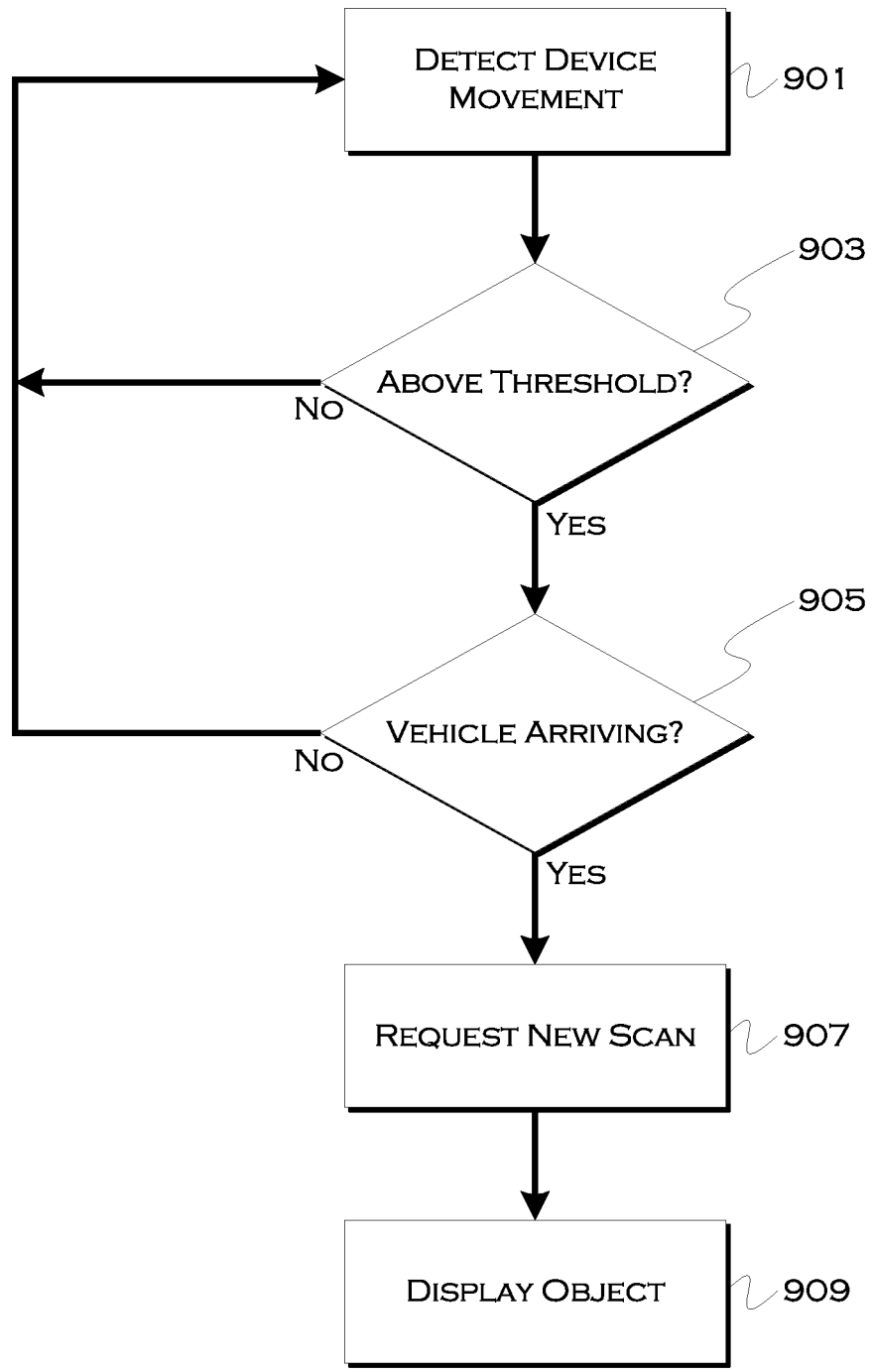
FIG. 9 shows an illustrative process for user reorientation.

FIG. 9 shows an illustrative process for user reorientation. In this example, the process may determine that a user has moved within a localized scene, and thus a new localized set of imaging may be requested. For example, the device can use onboard sensors to determine 901 if the device has moved more than a foot or two (or any other predefined distance) since the user imaged the scene. If the movement is above the threshold 903, the process may also determine 905 if the vehicle is imminently arriving.

Since the user may continue to move until the vehicle arrival is imminent, the process may not want an image of the scene until the vehicle is within a certain threshold time or distance away. Once the vehicle has arrived, the process may request 907 a new scan. Also, in this example, the process may display 909 one or more objects that were previously viewed based on a user scan, to allow the user to ensure that the same objects are recaptured in the new scan. This can make it easier to relocate the user in a digital scene, since the previous reference to the object was already known. This may also allow for limited sending of new data, if the user has merely moved relative to the object, and there is no other information to include, then it may not be necessary to actually resend any image data, but rather just factual data about the user's new location relative to the object(s).

Figure 10:
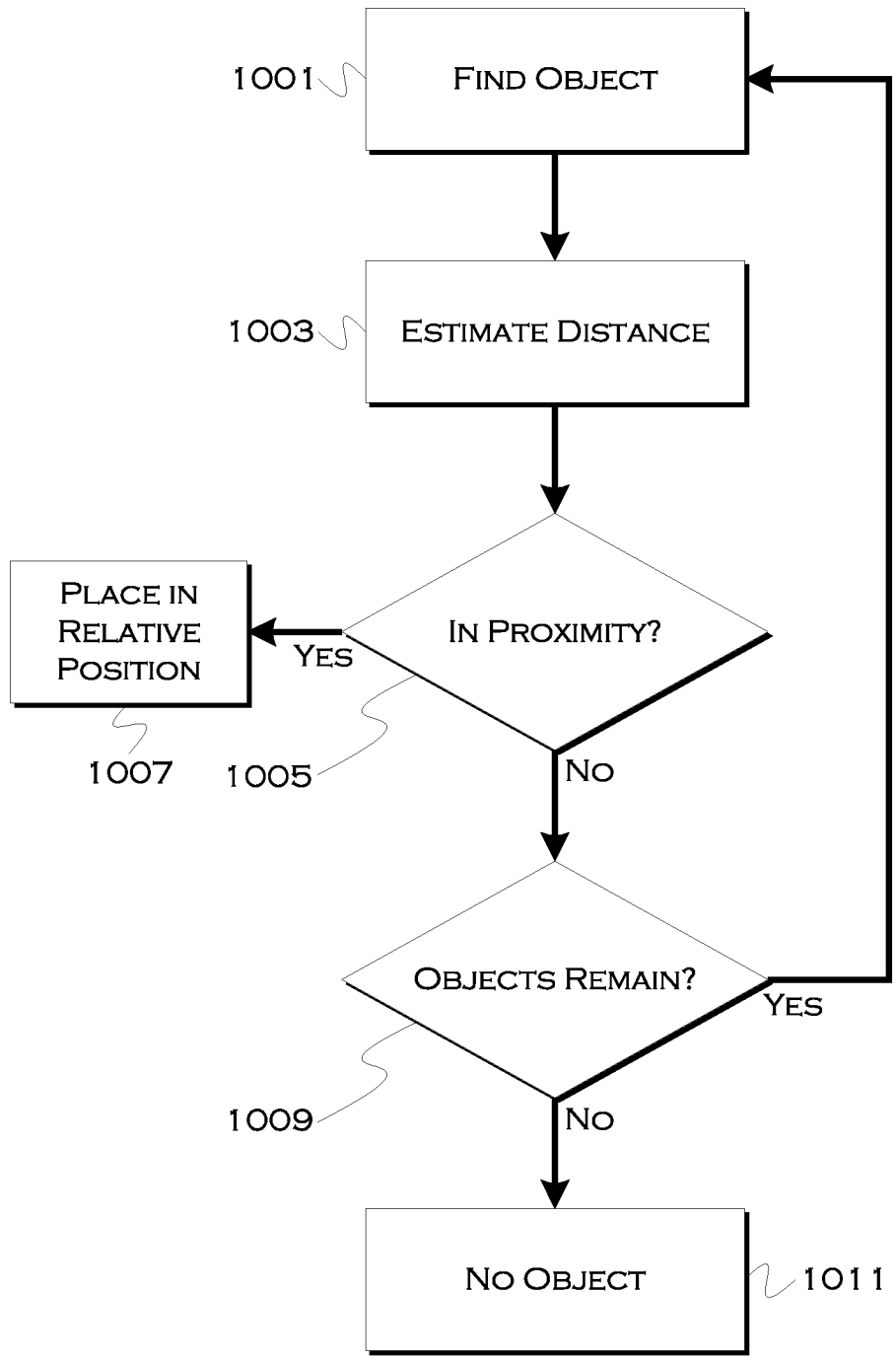
FIG. 10 shows an illustrative process for user localization.

FIG. 10 shows an illustrative process for user localization. In this example, the process isolates 1001 one or more objects within a user image. These may be objects of known heights (e.g., a street sign, a hydrant, etc) or they may be objects of varied height (e.g., a tree) If the height of the object is known, the process may be able to use geometry to calculate 1003 the distance from the user to the object. If the height of the object is arbitrary, or the object is not fully viewable within the scene (e.g., an 80 foot tree directly next to a user will not likely be fully included in the scene), the process may still be able to estimate the distance to the object and/or determine a relative user location with respect to the object. For any objects within a predefined proximity to the user (e.g., those that a driver may use as reference points to find a user) 1005, the process may place the object, in a digital data-set, in relative position to the user. Thus, if multiple local objects were present, the process may know the user's location relative to each object, and this may both make it easier to find an exact user location when the driver arrives and/or instruct the driver where to look for the user, with multiple points of reference. In this particular example, however, the process attempts to localize the user with respect to a single object, by choosing objects from the scene until either the object and user positions are relatively calculable or, when no objects remain 1009, the process may conclude 1011 that there is no usable object.

This latter conclusion can either cause the process to request a rescan of the scene, in an attempt to find an object, or the system can rely on other factors, such as local non-user entities, to assist in determining who the user is.

Figure 11:
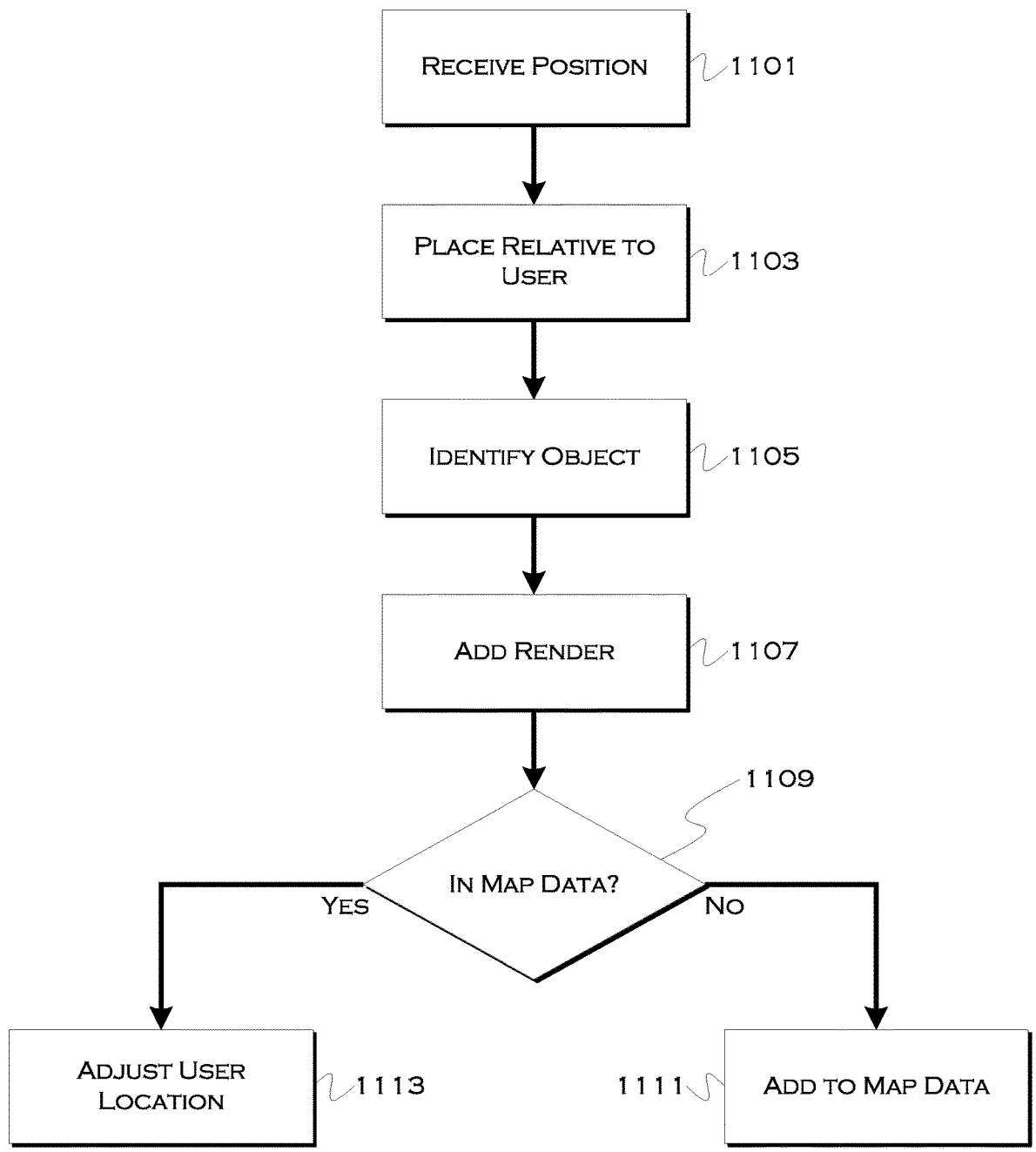
FIG. 11 shows an illustrative process for adding a user location to a digital, VR or AR scene.

FIG. 11 shows an illustrative process for adding a user location to a digital, virtual reality (VR) or augmented reality (AR) scene. In this illustrative example, the system may attempt to render one or more local objects and/or people in a VR, 3D, 2D or AR scene. This scene can be used by the driver to find a user, and can even be used by the user/passenger to ensure the person stays standing in the appropriate location while the vehicle arrives.

In this example, the process may use an image shot by the user to detect an object, and the process may receive 1101 a relative location of that object (e.g., a stop sign is eleven feet to a user's left) in a southeast direction. The process, which knows the location of the user in this example, may place 1103 the object or an object marker in a digital scene relative to a user location.

The process may also use known image characteristics or an object database to identify 1105 the object. Once identified, a digital proxy 1107 of the object can be added to a render of the scene. This can allow for a simplistic version of the object to be added to a digital scene, which can make processing that much faster. In some examples, the process may also attempt to determine 1109 if the object exists within present map data. That is, map data may not include every stop sign, hydrant, bus stop, etc., but if the process that detects these fixed objects can slowly add the objects to the data, then the real locations of those objects can become known, and this information can be better used to localize a user.

If the object is not in the map data, the process may add 1111 the object to the map data. This may involve a guess about where the object is physically located, but with several iterations of guessing based on multiple users (and based on the object further being seen by the vehicle as the vehicle arrives), it should be possible to get a very good sense of where the object is located fairly quickly.

If the object is already in the map data, and if the system has already confirmed the location of the object such that any additional scans do not need to be used to improve that location, the process instead may use the location of the object and its relative position to the user, to improve the current understanding of the user's location 1113.

By using temporary objects such as pedestrians and vehicles, identifiable through filtering of visual images, the illustrative embodiments can improve a driver understanding of which person in a crowd is a user, and where the user is standing relative to other, identifiable people, and/or relative to objects in near proximity to the passengers. This can improve pickup times, passenger identification and overall system throughput. The novel, uncommon and atypical examples and concepts described herein demonstrate potential improvements achievable through use of those examples, concepts, and the like.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A method comprising:
receiving, at a vehicle, a digital representation of a pick-up location, including a digital representation of at least one non-passenger entity or object, captured from a passenger device from a perspective of the device;
determining, based on information included in the representation, a relative position of the device relative to the non-passenger entity or object;
imaging a scene, from a vehicle perspective, including the real-world equivalent of the non-passenger entity or object;
inserting a digital indicator at a location in the imaged scene, the location indicating the position of the device in the imaged scene based on the determined relative position of the device relative to the non-passenger entity or object also included in the imaged scene; and
showing the imaged scene on a display, including the digital indicator, indicating a location of a passenger possessing the passenger device.

2. The method of claim 1, wherein the non-passenger entity includes another person other than the passenger.

3. The method of claim 2, wherein showing the digital representation includes showing a digital representation of the another person.

4. The method of claim 1, further comprising outputting instructions describing a passenger location relative to the non-user entity or object.

5. A method comprising:
receiving a first image of a non-user passenger object taken from the perspective of a first camera and transmitted by a passenger using the first camera;
receiving a passenger location and heading;
determining a first location of the non-passenger object relative to the passenger location based on the passenger location, heading and a known geometric characteristic of the non-passenger object;
rendering a scene from digital map data, including placing the non-passenger object relative to the passenger location based on the determined first location and placing a passenger identifier at the position of the passenger location; and
transmitting the rendered scene to a vehicle tasked with picking up the passenger.

6. The method of claim 5, wherein the non user passenger object includes a fixed object.

7. The method of claim 6, further comprising associating a map location with the fixed object in the digital map data based on the determined relative object location.

8. The method of claim 7, further comprising:
receiving a second image of the fixed object from a user using a second camera;
receiving a location and heading of the user;
determining a second location of the fixed object relative to the user location based on the user location, heading and the known geometric characteristic of the fixed object; and
updating the map location associated with the fixed object based on the second location relative to the user location when the second location relative to the user location indicates a variance in location from the previously determined first location relative to the passenger location.

9. The method of claim 7, further comprising:
receiving a second image of the fixed object from a camera of the vehicle;
receiving a location and heading of the vehicle;
determining a second object location of the fixed object relative to the vehicle location based on the vehicle location, heading and the known geometric characteristic of the fixed object; and
updating the map location associated with the fixed object based on the second location relative to the vehicle location when the second location relative to the vehicle location indicates a variance in location from the previously determined first location relative to the passenger location.

10. A method comprising:
receiving a first image including a plurality of non-passenger objects taken from the perspective of a first camera and transmitted by a passenger using the first camera;
receiving a location and heading of the passenger;
determining a first object from the plurality of non-passenger objects that has at least one known geometric characteristic based on identification of the known geometric characteristic in the first image;
responsive to determining the first object, determining a first location of the first object relative to the passenger location based on the passenger location, heading and the known geometric characteristic of the first object as identified in the first image;
rendering a scene from digital map data, including placing the first object relative to the passenger location based on the determined first location and a placing user identifier at the position of the passenger location; and
transmitting the rendered scene to a vehicle tasked with picking up the passenger.

11. The method of claim 10, wherein the first object includes a fixed object.

12. The method of claim 11, further comprising associating a map location with the fixed first object in the digital map data.

13. The method of claim 12, further comprising:
receiving a second image of the first object from a user using a second camera and including the known geometric characteristic of the first object displayed in the second image;
receiving a location and heading of the user;
determining a second location of the first object relative to the user location based on the user location, heading and the known geometric characteristic of the first object displayed in the second image; and
updating the map location associated with the first object based on the second location relative to the user location when the second location indicates a variance in location of the first object from the previously determined first location.

14. The method of claim 12, further comprising:
receiving a second image of the first object from a camera of the vehicle;
receiving a location and heading of the vehicle;
determining a second location of the first object relative to the vehicle location based on the vehicle location, heading and the known geometric characteristic of the first object; and updating the map location associated with the first object based on the second location when the second location indicates a variance in location of the first object from the previously determined first location.

15. The method of claim 10, further comprising:

determining a second object from the plurality of non-passenger objects that has at least one known second geometric characteristic based on identification of the known second geometric characteristic in the first image;

responsive to determining the second object, determining a second location of the second object relative to the passenger location based on the passenger location, heading and the known second geometric characteristic of the second object;

rendering a scene from digital map data, including the first and second objects placed relative to the passenger location and the user identifier at the position of the passenger location; and transmitting the rendered scene to the vehicle tasked with picking up the passenger.

16. The method of claim 15, wherein the second object includes a fixed object and the method further comprises associating a map location with the second object in the digital map data.

17. The method of claim 16, further comprising:

receiving a second image of the second object from a user using a second camera including the known second geometric characteristic of the second object displayed in the second image;

receiving a location and heading of the user;

determining a third location of the second object relative to the user location based on the user location, heading and the known second geometric characteristic of the second object; and updating the map location associated with the second object based on the third location when the third location indicates a variance in location of the second object from the previously determined second location.

18. The method of claim 16, further comprising:

receiving a second image of the second object from a camera of the vehicle including the known second geometric characteristic of the second object displayed in the second image;

receiving a location and heading of the vehicle;

determining a third location of the second object relative to the vehicle location based on the vehicle location, heading and the known second geometric characteristic of the second object; and updating the map location associated with the second object based on the third location when the third location indicates a variance in location of the second object from the previously determined second location.

* * * * *